(12) United States Patent
Nishida

(10) Patent No.: US 9,912,825 B2
(45) Date of Patent: Mar. 6, 2018

(54) INCOMPATIBLE SETTING PROCESSING APPARATUS, INCOMPATIBLE SETTING PROCESSING METHOD, AND COMPUTER PROGRAM PRODUCT

(71) Applicant: Takeshi Nishida, Kanagawa (JP)

(72) Inventor: Takeshi Nishida, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/856,037

(22) Filed: Sep. 16, 2015

(65) Prior Publication Data

US 2016/0080600 A1 Mar. 17, 2016

(30) Foreign Application Priority Data

Sep. 17, 2014 (JP) ................................. 2014-189436
Jul. 23, 2015 (JP) ................................. 2015-146055

(51) Int. Cl.
*G06F 15/00* (2006.01)
*H04N 1/00* (2006.01)

(52) U.S. Cl.
CPC ..... *H04N 1/00925* (2013.01); *H04N 1/00063* (2013.01); *H04N 1/00074* (2013.01); *H04N 1/00392* (2013.01); *H04N 2201/0094* (2013.01); *H04N 2201/0098* (2013.01)

(58) Field of Classification Search
CPC ........... H04N 1/00925; H04N 1/00063; H04N 1/00074; H04N 1/00392
USPC ....................................................... 358/1.14
See application file for complete search history.

(56) References Cited

U.S. PATENT DOCUMENTS

| | | | |
|---|---|---|---|
| 8,020,170 B2 | 9/2011 | Fukasawa | |
| 8,958,106 B2 | 2/2015 | Ishihara et al. | |
| 2008/0147706 A1* | 6/2008 | Anglin | G06Q 10/109 |
| 2013/0108234 A1* | 5/2013 | Ishihara | G11B 27/3027 386/224 |
| 2013/0265606 A1* | 10/2013 | Tsuya | H04N 1/0035 358/1.15 |

FOREIGN PATENT DOCUMENTS

| | | |
|---|---|---|
| JP | 2007-299324 | 11/2007 |
| JP | 2008-269160 | 11/2008 |
| JP | 2014-178764 | 9/2014 |

\* cited by examiner

*Primary Examiner* — Mark Milia
(74) *Attorney, Agent, or Firm* — Duft Bornsen & Fettig LLP

(57) ABSTRACT

An incompatible setting processing apparatus includes: a display unit that displays a setting screen for setting options of setting items; an extracting unit that extracts, for each of the options of each of the setting items, a first option that is an option of a setting item satisfying an incompatible setting condition on a basis of incompatible setting condition information associating incompatible setting conditions for the options of the setting items with display character strings indicating the respective incompatible setting conditions; an input unit that selects an option of each setting item in the setting screen in accordance with a received operating input; a prohibiting unit that prohibits selection of the first option by the input unit; and a display control unit that displays a display character string associated with the incompatible setting condition corresponding to the first option, which is acquired from the incompatible setting condition information.

14 Claims, 14 Drawing Sheets

FIG.4

INCOMPATIBLE SETTING CONDITION TABLE 600

| SETTING ITEM (1) (SHEET SIZE) | SETTING ITEM (2) (SHEET FEEDING DIRECTION) | SETTING ITEM (3) (BASIS WEIGHT) | SETTING ITEM (4) (COLOR) | SETTING ITEM (5) (SHEET TYPE) | SETTING ITEM (6) (DUPLEX PRINTING) | DISPLAY CHARACTER STRINGS |
|---|---|---|---|---|---|---|
| | | BASIS WEIGHT 1 | | LABEL SHEET | | COMBINATION OF LABEL SHEET AND BASIS WEIGHT 1 IS PROHIBITED |
| | | | | TRACING PAPER | ENABLED | COMBINATION OF TRACING PAPER AND ENABLED DUPLEX PRINTING IS PROHIBITED |
| | | | | OHP | ENABLED | COMBINATION OF OHP SHEET AND ENABLED DUPLEX PRINTING IS PROHIBITED |
| | | | | INDEX PAPER | ENABLED | COMBINATION OF INDEX PAPER AND ENABLED DUPLEX PRINTING IS PROHIBITED |
| A4 | LENGTHWISE FEED | | | INDEX PAPER | | COMBINATION OF INDEX PAPER, A4, AND LENGTHWISE FEED IS PROHIBITED |
| LETTER | LENGTHWISE FEED | | | INDEX PAPER | | COMBINATION OF INDEX PAPER, LETTER, AND LENGTHWISE FEED IS PROHIBITED |
| LEGAL | CROSSWISE FEED | | | INDEX PAPER | | COMBINATION OF INDEX PAPER, LEGAL, AND CROSSWISE FEED IS PROHIBITED |
| NOT (A4 OR LETTER OR LEGAL) | | | | INDEX PAPER | | COMBINATION OF INDEX PAPER AND ** IS PROHIBITED |

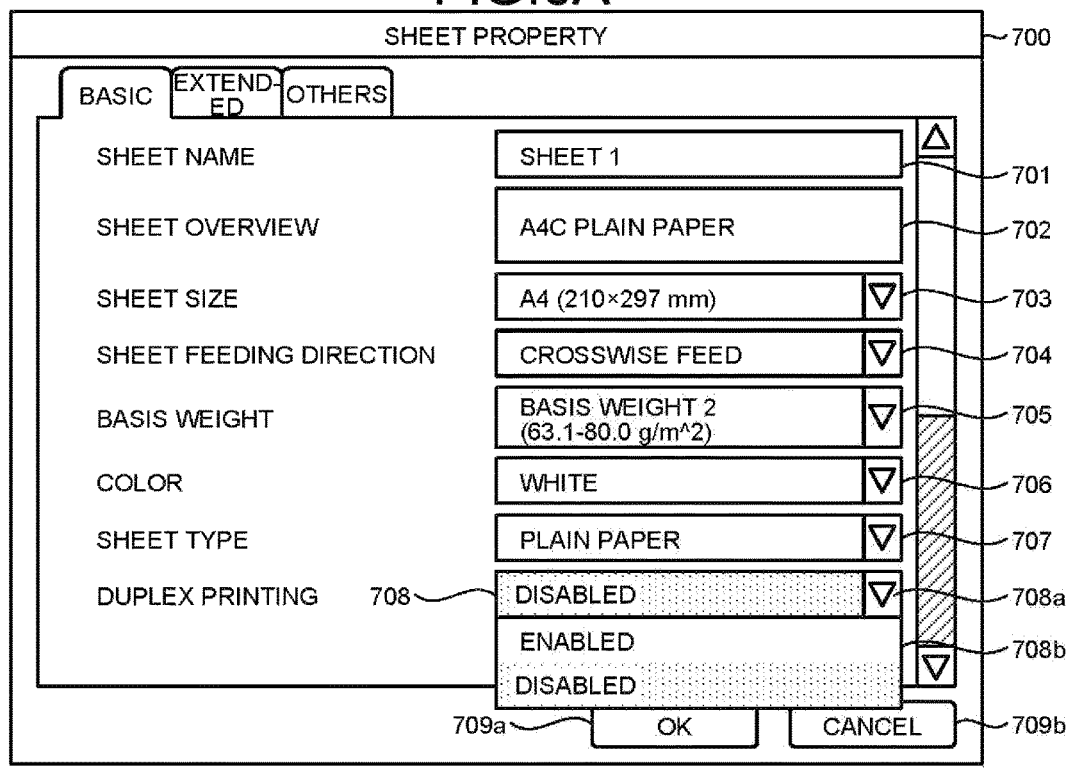
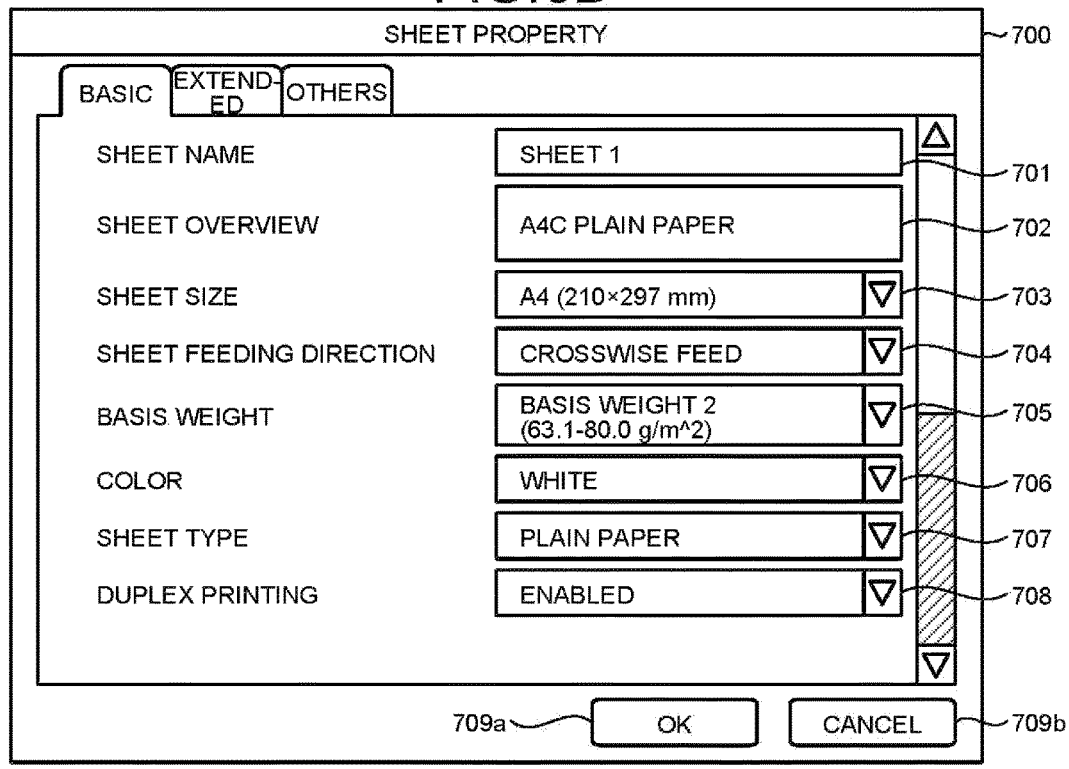

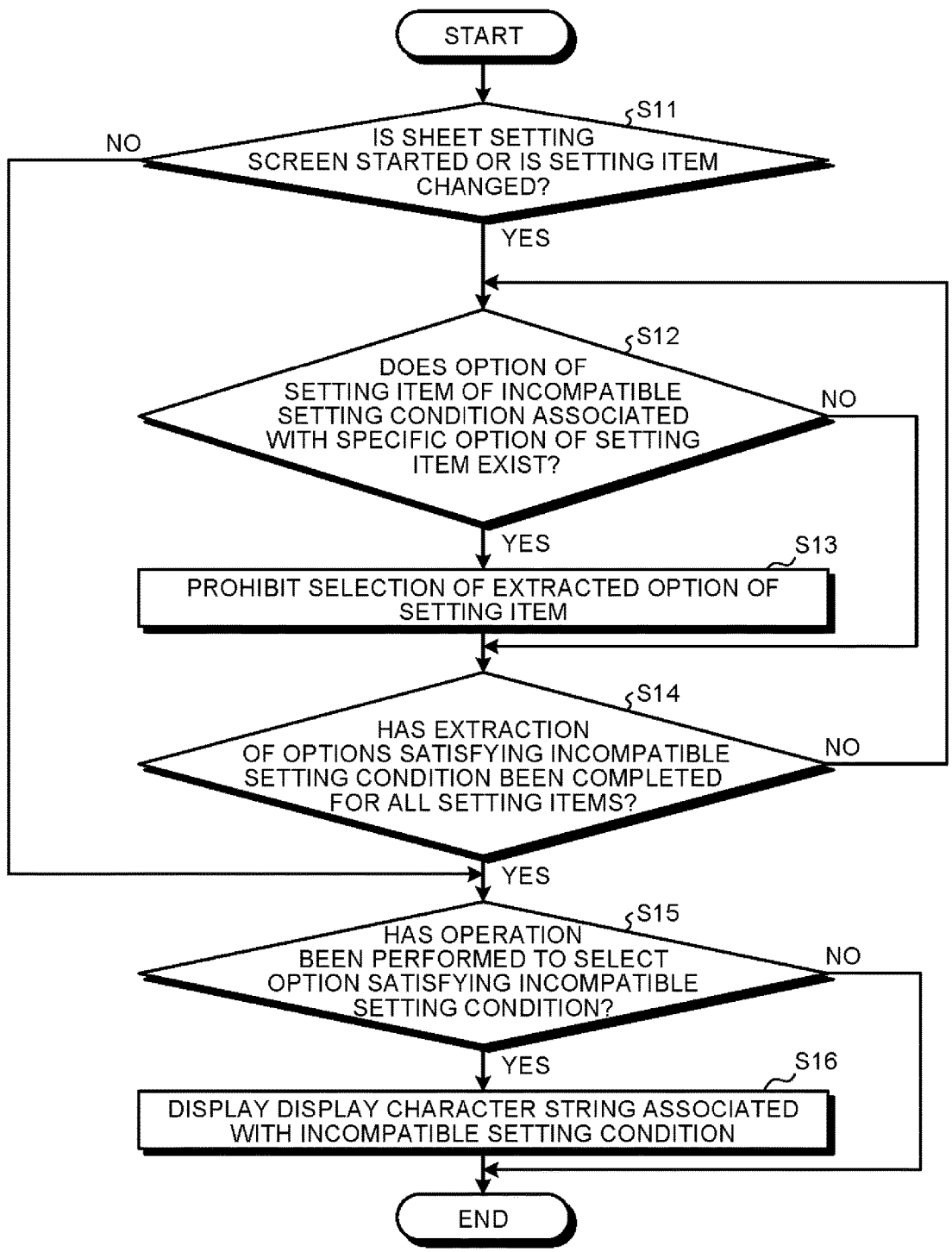

FIG.11

INCOMPATIBLE SETTING CONDITION TABLE 600a

| SETTING ITEM (1) (SHEET SIZE) | SETTING ITEM (2) (SHEET FEEDING DIRECTION) | SETTING ITEM (3) (BASIS WEIGHT) | SETTING ITEM (4) (COLOR) | SETTING ITEM (5) (SHEET TYPE) | SETTING ITEM (6) (DUPLEX PRINTING) | SETTING ITEM (7) (NUMBER OF TABS) | SETTING ITEM (8) (TAB WIDTH) | PROCESSING CHOICE (0: SELECTION PROHIBITED 1: HIDDEN) | DISPLAY CHARACTER STRINGS |
|---|---|---|---|---|---|---|---|---|---|
| | | BASIS WEIGHT 1 | | LABEL SHEET | | | | 0 | COMBINATION OF LABEL SHEET AND BASIS WEIGHT 1 IS PROHIBITED |
| | | | | TRACING PAPER | ENABLED | | | 0 | COMBINATION OF TRACING PAPER AND ENABLED DUPLEX PRINTING IS PROHIBITED |
| | | | | OHP | ENABLED | | | 0 | COMBINATION OF OHP SHEET AND ENABLED DUPLEX PRINTING IS PROHIBITED |
| | | | | INDEX PAPER | ENABLED | | | 0 | COMBINATION OF INDEX PAPER AND ENABLED DUPLEX PRINTING IS PROHIBITED |
| A4 | LENGTHWISE FEED | | | INDEX PAPER | | | | 0 | COMBINATION OF INDEX PAPER, A4, AND LENGTHWISE FEED IS PROHIBITED |
| LETTER | LENGTHWISE FEED | | | INDEX PAPER | | | | 0 | COMBINATION OF INDEX PAPER, LETTER, AND LENGTHWISE FEED IS PROHIBITED |
| | | | | INDEX PAPER | | ALL | | 1 | |
| NOT (A4 OR LETTER OR LEGAL) | | | | NOT (INDEX PAPER) | | | ALL | 1 | |

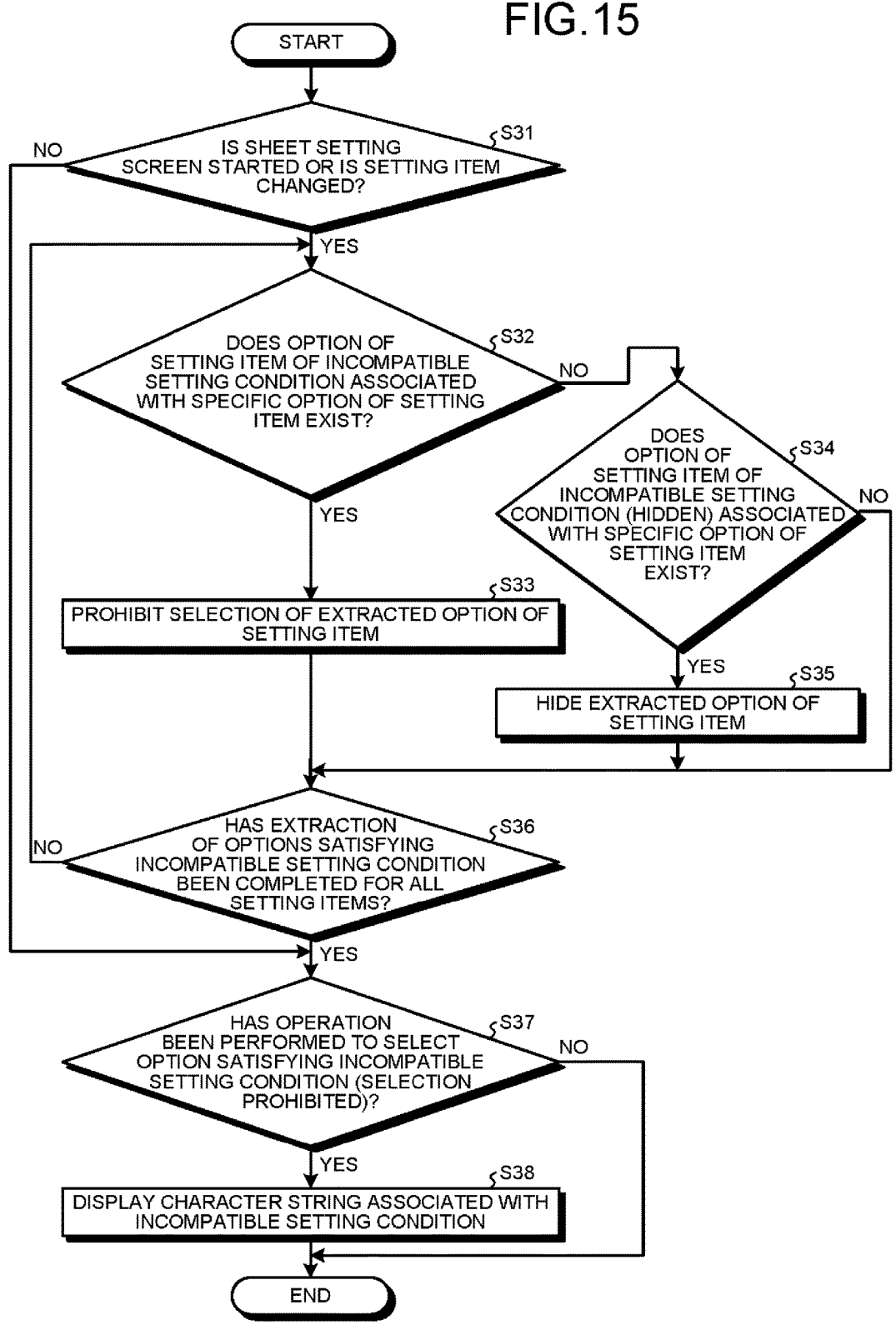

INCOMPATIBLE SETTING PROCESSING APPARATUS, INCOMPATIBLE SETTING PROCESSING METHOD, AND COMPUTER PROGRAM PRODUCT

CROSS-REFERENCE TO RELATED APPLICATIONS

The present application claims priority to and incorporates by reference the entire contents of Japanese Patent Application No. 2014-189436 filed in Japan on Sep. 17, 2014 and Japanese Patent Application No. 2015-146055 filed in Japan on Jul. 23, 2015.

BACKGROUND OF THE INVENTION

1. Field of the Invention

The present invention relates to an incompatible setting processing apparatus, an incompatible setting processing method, and a computer program product.

2. Description of the Related Art

A known technique allows a user to recognize, when an incompatible setting condition exists among a plurality of setting items, occurrence of the incompatible setting condition. As such an apparatus that allows the user to recognize the occurrence of an incompatible setting condition, an apparatus has been developed that displays a message indicating that a combination of set items is prohibited when an incompatible setting condition occurs, while disabling the input or selection of items that cause the incompatible setting condition to occur. The apparatus has been developed with the aim of achieving consistency of conditions for prohibiting and permitting selections by controlling a user interface through simple processing (see Japanese Laid-open Patent Publication No. 2007-299324).

Although the known technique displays a message indicating the occurrence of an incompatible setting condition, unfortunately, the message is not appropriate for allowing the user to resolve the incompatible setting condition and does not readily allow the user to intuitively relate the message to a specific item that has caused the incompatible setting condition.

In view of the foregoing, there is a need to provide an incompatible setting processing apparatus, an incompatible setting processing method, and a computer program product that can appropriately display a message for resolving an incompatible setting condition.

SUMMARY OF THE INVENTION

It is an object of the present invention to at least partially solve the problems in the conventional technology.

An incompatible setting processing apparatus includes: a storage unit that stores therein incompatible setting condition information, the incompatible setting condition information associating incompatible setting conditions for options of a plurality of setting items with display character strings indicating the respective incompatible setting conditions; a display unit that displays a setting screen for setting the options of the setting items; an extracting unit that extracts, for each of the options of each of the setting items, a first option that is an option of a setting item satisfying an incompatible setting condition on a basis of the incompatible setting condition information; an input unit that receives an operating input and selects an option of each setting item in the setting screen in accordance with the operating input; a prohibiting unit that prohibits selection of the first option by the input unit; and a display control unit that acquires, from the incompatible setting condition information, a display character string associated with the incompatible setting condition corresponding to the first option, selection of which by the input unit is prohibited, and displays the display character string on the display unit.

An incompatible setting processing method includes: displaying, on a display unit, a setting screen for setting options of a plurality of setting items; extracting, for each of the options of each of the setting items, a first option that is an option of a setting item satisfying an incompatible setting condition on a basis of incompatible setting condition information that associates incompatible setting conditions for the options of the setting items with display character strings indicating the respective incompatible setting conditions; receiving an operating input and selecting an option of each setting item in the setting screen in accordance with the operating input; prohibiting selection of the first option at the selecting; and acquiring, from the incompatible setting condition information, a display character string associated with the incompatible setting condition corresponding to the first option, selection of which at the selecting has been prohibited and displaying the display character string on the display unit.

A computer program product includes a non-transitory computer-readable medium containing an information processing program. The program causes a computer to function as: an extracting unit that extracts, on a basis of incompatible setting condition information that associates incompatible setting conditions for options of a plurality of setting items with display character strings indicating the respective incompatible setting conditions, a first option that is an option of a setting item satisfying an incompatible setting condition for each of the options of each of the setting items; a prohibiting unit that, in a setting screen that is displayed by a display unit and is for setting the options of the setting items, prohibits selection of the first option by an input unit that receives an operating input and selects an option of each setting item in accordance with the operating input; and a display control unit that acquires, from the incompatible setting condition information, a display character string associated with the incompatible setting condition corresponding to the first option, selection of which by the input unit is prohibited, and displays the display character string on the display unit.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 4 is a table illustrating an exemplary configuration of an incompatible setting condition table according to the first embodiment;

FIGS. 6A and 6B are diagrams illustrating an exemplary operation performed for changing an option of a setting item in the sheet setting screen according to the first embodiment;

FIG. 9 is a flowchart illustrating exemplary operations performed in incompatible setting processing in the information processing apparatus according to the first embodiment;

FIG. 11 is a table illustrating an exemplary configuration of an incompatible setting condition table according to a second embodiment of the present invention;

FIG. 15 is a flowchart illustrating exemplary operations performed in incompatible setting processing in the information processing apparatus according to the second embodiment.

DETAILED DESCRIPTION OF THE PREFERRED EMBODIMENTS

The following describes in detail, with reference to FIGS. 1 to 15, an incompatible setting processing apparatus, an incompatible setting processing method, and a computer program product according to embodiments of the present invention. It should be understood that this invention is not limited to the illustrative embodiments set forth herein and the elements described in the following embodiments include those that can be easily arrived at by a person skilled in the art, those substantially identical to the described elements, and what is called equivalents. Furthermore, various omissions, substitutions, changes, and combinations of such elements may be made without departing from the gist of the following embodiments.

First Embodiment

General Configuration of Printing System

Figure 1:
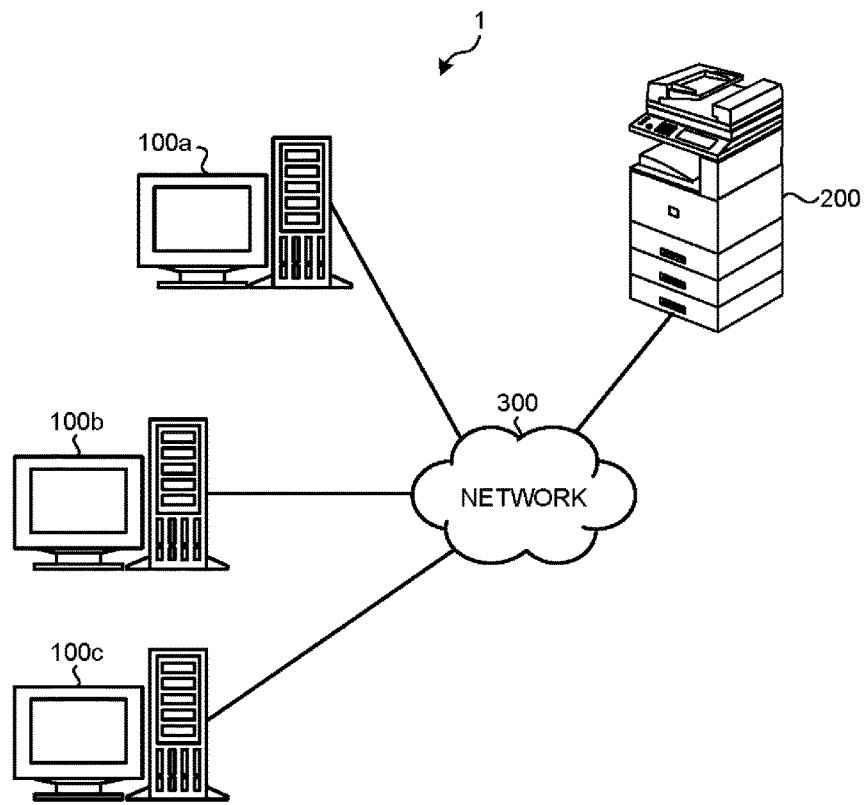
FIG. 1 is a diagram illustrating an exemplary general configuration of a printing system according to a first embodiment of the present invention.

FIG. 1 is a diagram illustrating an exemplary general configuration of a printing system according to a first embodiment of the present invention. The following describes with reference to FIG. 1 the configuration of the printing system according to the first embodiment.

As illustrated in FIG. 1, this printing system 1 according to the first embodiment includes personal computers (PCs) 100a to 100c as exemplary information processing apparatuses and a printer 200 as an exemplary image forming apparatus. The PCs 100a to 100c and the printer 200 are connected to each other via a network 300 in a manner of being capable of communicating with each other.

The PCs 100a to 100c each transmit print data generated on the basis of specific print settings using a sheet setting screen 700 to be described later to the printer 200. The printer 200 performs print output on a sheet on the basis of the received print data. It is noted that the PCs 100a to 100c may be undistinctively or collectively referred to simply as a "PC 100".

The network 300 achieves data communications using, for example, a set of protocols of Transmission Control Protocol/Internet Protocol (TCP/IP).

Hardware Configuration of Information Processing Apparatus

Figure 2:
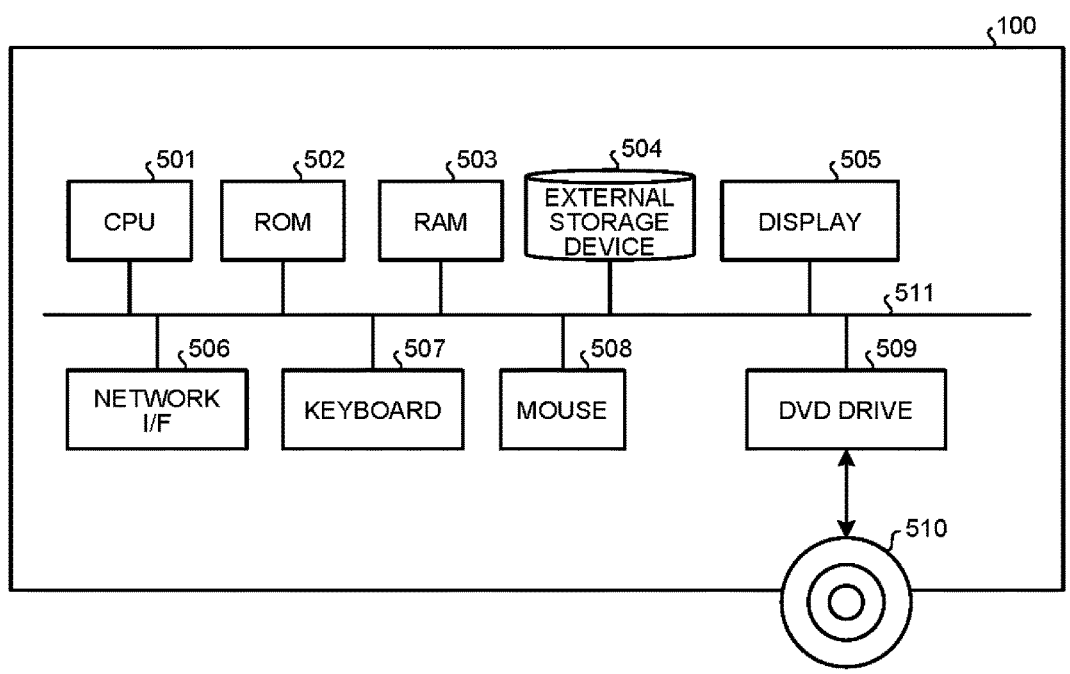
FIG. 2 is a diagram illustrating an exemplary hardware configuration of an information processing apparatus according to the first embodiment.

FIG. 2 is a diagram illustrating an exemplary hardware configuration of the information processing apparatus according to the first embodiment. The following describes with reference to FIG. 2 the hardware configuration of the PC 100 (an incompatible setting processing apparatus) according to the first embodiment.

As illustrated in FIG. 2, the PC 100 includes a central processing unit (CPU) 501, a read only memory (ROM) 502, a random access memory (RAM) 503, an external storage device 504, a display 505, a network I/F 506, a keyboard 507, a mouse 508, and a digital versatile disc (DVD) drive 509.

The CPU 501 controls general operations of the PC 100. The ROM 502 is a nonvolatile storage device that stores therein computer programs for use by the PC 100. The RAM 503 is a volatile storage device used as a work area for the CPU 501.

The external storage device 504 may, for example, be a hard disk drive (HDD) or a solid state drive (SSD) that stores therein print data generated by the PC 100, setting information, an incompatible setting condition table 600 to be described later, and various other types of data.

The display 505 displays, for example, a cursor, a menu, a window, various information such as a character or an image, or the sheet setting screen 700 on which an incompatible setting operation is performed by the PC 100. The display 505 may, for example, be a cathode ray tube (CRT) display, a liquid crystal display, a plasma display, or an organic electroluminescence (EL) display.

The network I/F 506 is an interface that connects to the network 300 to thereby perform data communications. The network I/F 506 may, for example, be a network interface card (NIC) that enables communications by the TCP/IP protocol. Specifically, the printer 200 acquires print data from the PC 100 via the network 300 and the network I/F 506.

The keyboard 507 serves as an input device with which a character, a numeral, and various types of instructions are selected, the cursor is moved, print sheet setting information is set, and related operations are performed. The mouse 508 is an input device with which, for example, various types of instructions are selected and executed, an object to be processed is selected, the cursor is moved, and print sheet setting information is set.

The DVD drive 509 controls reading, writing, and deleting data with respect to a DVD 510 as an exemplary removable storage medium.

The CPU 501, the ROM 502, the RAM 503, the external storage device 504, the display 505, the network I/F 506, the keyboard 507, the mouse 508, and the DVD drive 509 described above are connected to each other in a manner of being capable of communicating with each other by a bus 511 such as an address bus and a data bus.

Functional Block Configuration of Information Processing Apparatus

Figure 3:
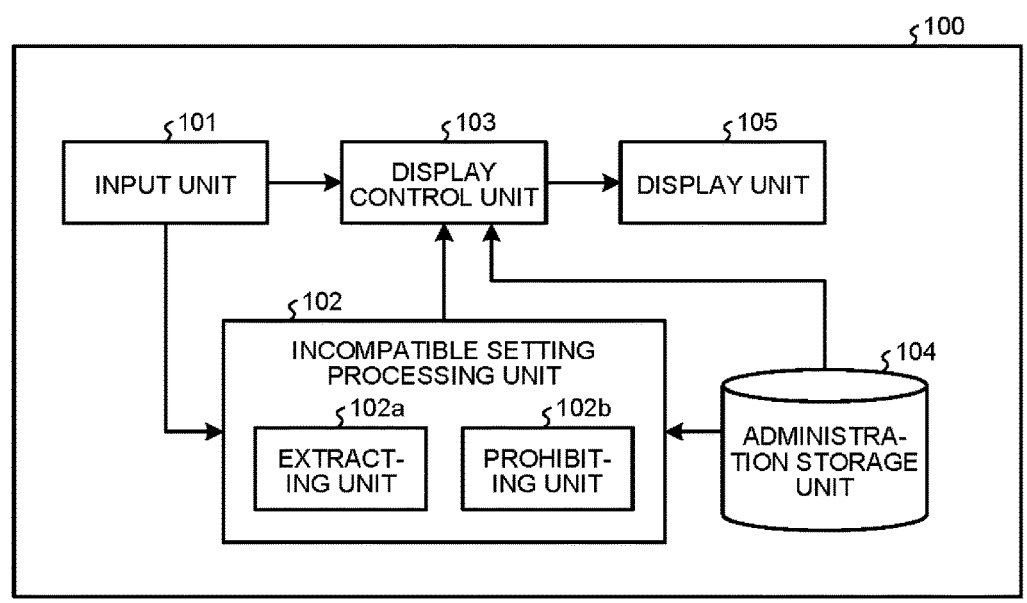
FIG. 3 is a diagram illustrating an exemplary functional block configuration of the information processing apparatus according to the first embodiment.

FIG. 3 is a diagram illustrating an exemplary functional block configuration of the information processing apparatus according to the first embodiment. The following describes with reference to FIG. 3 the functional block configuration of the PC 100 according to the first embodiment.

As illustrated in FIG. 3, the PC 100 includes an input unit 101 (input unit), an incompatible setting processing unit 102, a display control unit 103 (display control unit), an administration storage unit 104 (storage unit), and a display unit 105 (display unit).

The input unit 101 functions to receive an operation performed by a user and generate an operating signal. The input unit 101 is achieved by, for example, the keyboard 507 or the mouse 508 illustrated in FIG. 2.

The incompatible setting processing unit 102 functions to extract an option of a setting item satisfying an incompatible setting condition specified by the incompatible setting condition table 600 stored in the administration storage unit 104. The incompatible setting condition table 600 will be described later. The incompatible setting processing unit 102 includes an extracting unit 102*a* (extracting unit) and a prohibiting unit 102*b* (prohibiting unit). The incompatible setting processing unit 102 is achieved by a program executed by the CPU 501 illustrated in FIG. 2.

When, for example, details of a setting item in print settings are changed (edited), the extracting unit 102*a* functions to extract an option of another setting item satisfying the incompatible setting condition specified by the incompatible setting condition table 600 with respect to the changed option. The prohibiting unit 102*b* functions to prohibit selection of the option of the setting item extracted by the extracting unit 102*a*, specifically, to disable the selection.

When the option of the setting item that has been prohibited from being selected as a result of the extraction by the incompatible setting processing unit 102 is selected by the input unit 101, the display control unit 103 functions to acquire a display character string of the incompatible setting condition associated with the item from the incompatible setting condition table 600 illustrated in FIG. 4 described later and to display the display character string on the display unit 105. The display control unit 103 is achieved by a program executed by the CPU 501 illustrated in FIG. 2.

The administration storage unit 104 stores therein, for example, the settings of the setting items in the print settings and the incompatible setting condition table 600. The administration storage unit 104 is achieved by the external storage device 504 illustrated in FIG. 2.

The display unit 105 displays, for example, an application screen and a setting screen under control by the display control unit 103. The display unit 105 is achieved by the display 505 illustrated in FIG. 2.

The printing system 1 has been described so as to include the PC 100 and the printer 200 as illustrated in FIG. 1. This is, however, not the only possible configuration. Alternatively, the printing system 1 may, for example, be a multi-function peripheral (MFP). In this case, the input unit 101 is achieved by a touch operating function using a touch panel and the display unit 105 is achieved by a touch panel display function.

The incompatible setting processing unit 102 that includes the extracting unit 102*a* and the prohibiting unit 102*b*, and the display control unit 103 may be achieved in part or in whole by a hardware circuit, instead of a program as software. In addition, the functions of the input unit 101, the incompatible setting processing unit 102 including the extracting unit 102*a* and the prohibiting unit 102*b*, the display control unit 103, the administration storage unit 104, and the display unit 105 have been conceptually described and the illustrated configuration is not the only possible arrangement.

Incompatible Setting Condition Table

FIG. 4 is a table illustrating an exemplary configuration of the incompatible setting condition table according to the first embodiment. The following describes with reference to FIG. 4 the configuration of the incompatible setting condition table 600.

The incompatible setting condition table 600 (incompatible setting condition information) illustrated in FIG. 4 is an exemplary table that specifies combinations of options that cannot be simultaneously set (incompatible setting conditions) because of, for example, technical or logical factors involved in the options of various setting items in the print settings. The incompatible setting condition table 600 further associates the combinations (incompatible setting conditions) with respective display character strings. The incompatible setting condition table 600 illustrated in FIG. 4 includes as the setting items for the print settings, for example, "setting item (1) (sheet size), "setting item (2)" (sheet feeding direction), "setting item (3)" (basis weight), "setting item (4)" (color), "setting item (5)" (sheet type), and "setting item (6)" (duplex printing).

An example of the incompatible setting condition includes a combination of, for example, "tracing paper", "OHP (overhead projector) sheet", or "index paper" as the sheet type and "enabled" duplex printing as illustrated in FIG. 4. This combination constitutes an incompatible setting condition. Specifically, the setting of "tracing paper", "OHP sheet", or "index paper" for the sheet type is not compatible with a setting of "enabled" for duplex printing.

A combination of "A4" for the sheet size, "lengthwise feed" for the sheet feeding direction, and "index paper" for the sheet type constitutes another incompatible setting condition. The display character string associated with this incompatible setting condition is "A combination of index paper, A4, and lengthwise feed is prohibited". Uses of the display character strings will be described in detail with reference to FIGS. 7A and 7B and FIGS. 8A and 8B.

If a combination of "index paper" for the sheet type and a sheet size other than "A4", "letter", and "legal" constitutes an incompatible setting condition, the incompatible setting condition table 600 specifies a Boolean expression in a sheet size field (column), such as "NOT (A4 or letter or legal)". This management approach eliminates the need for preparing a record of incompatible setting conditions enumerating all sheet size options other than "A4", "letter", and "legal".

The setting items for the print settings in the printing system 1 are not limited only to those included in the incompatible setting condition table 600 illustrated in FIG. 4 given for illustrative purposes only.

In addition, the method for storing association between the incompatible setting conditions (combinations of options of setting items incompatible with each other) and the display character strings is not limited only to the method using the incompatible setting condition table 600 illustrated in FIG. 4. The method is required only to be capable of associating one with the other in the similar manner.

Figure 5:
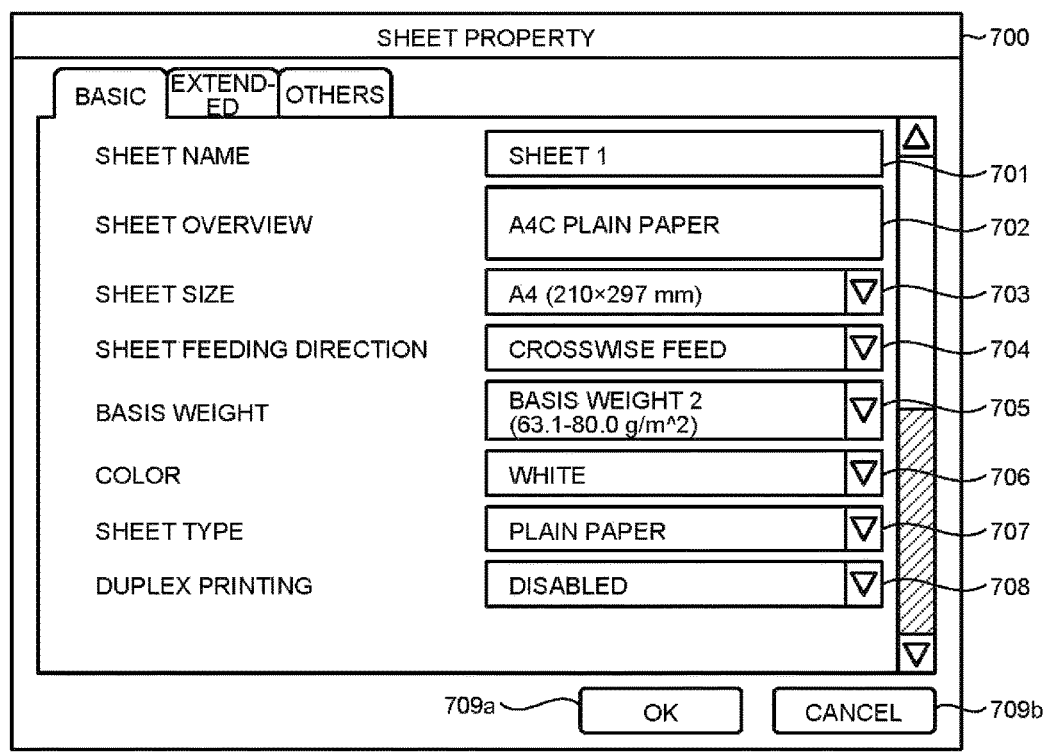
FIG. 5 is a diagram illustrating exemplary settings of setting items in a sheet setting screen according to the first embodiment.

Overview of Incompatible Setting Condition Table and Incompatible Setting Processing FIG. 5 is a diagram illustrating exemplary settings of setting items in the sheet setting screen according to the first embodiment. The following describes with reference to FIG. 5 an exemplary configuration of the sheet setting screen 700 and exemplary settings of the setting items.

The sheet setting screen 700 (setting screen) displayed on the display unit 105 represents an exemplary screen on which print settings are made for the printing system 1. The sheet setting screen 700 illustrated in FIG. 5 includes a sheet name setting portion 701, an overview display portion 702, a sheet size setting portion 703, a sheet feeding direction setting portion 704, a basis weight setting portion 705, a color setting portion 706, a sheet type setting portion 707, a duplex printing setting portion 708, an OK button 709a, and a cancel button 709b.

The sheet name setting portion 701 is a portion in which a name for the combination of print settings (sheet name) is input. In the example of the sheet setting screen 700 illustrated in FIG. 5, "sheet 1" is input in the sheet name setting portion 701.

The overview display portion 702 is a portion where a character string that describes an overview of a combination of settings of the setting items of the print settings determined by the sheet name in the sheet name setting portion 701 is displayed. In the example of the sheet setting screen 700 illustrated in FIG. 5, the overview display portion 702 displays a character string that combines the settings of the sheet size, the sheet feeding direction, and the sheet type out of the setting items. For example, when the sheet size is "A4 (210×297 mm)", the sheet feeding direction is "crosswise feed", and the sheet type is "plain paper", the sheet overview is indicated by the character string of "A4C plain paper" that represents the combination of the foregoing settings.

The sheet size setting portion 703 is a portion in which the sheet size is set according to an operation received by the input unit 101. For example, any of options including "A4 (210×297 mm)", "A3 (297×420 mm)", "letter", and "legal" can be set in the sheet size setting portion 703. The sheet setting screen 700 illustrated in FIG. 5 indicates that "A4 (210×297 mm)" is selected or set as the sheet size.

The sheet feeding direction setting portion 704 is a portion in which the sheet feeding direction is set according to an operation received by the input unit 101. For example, either of the options of "lengthwise feed" and "crosswise feed" can be set as the sheet feeding direction in the sheet feeding direction setting portion 704. The sheet setting screen 700 illustrated in FIG. 5 indicates that "crosswise feed" is selected or set as the sheet feeding direction.

The basis weight setting portion 705 is a portion in which the basis weight is set according to an operation received by the input unit 101. For example, any of options including "basis weight 1 (52.3 to 63.0 g/m$^2$)" and "basis weight 2 (63.1 to 80.0 g/m$^2$)" can be set as the basis weight in the basis weight setting portion 705. The sheet setting screen 700 illustrated in FIG. 5 indicates that "basis weight 2 (63.1 to 80.0 g/m$^2$)" is selected or set as the basis weight.

The color setting portion 706 is a portion in which the color of the printing sheet is set according to an operation received by the input unit 101. For example, any of options including "white", "blue", "red", and "yellow" can be set in the color setting portion 706 as the color. The sheet setting screen 700 illustrated in FIG. 5 indicates that "white" is selected or set as the color.

The sheet type setting portion 707 is a portion in which the sheet type is set according to an operation received by the input unit 101. For example, any of options including "plain paper", "label sheet", "tracing paper", "OHP sheet", and "index paper" can be set as the sheet type in the sheet type setting portion 707. The sheet setting screen 700 illustrated in FIG. 5 indicates that "plain paper" is selected or set as the sheet type.

The duplex printing setting portion 708 is a portion in which whether duplex printing is enabled or disabled is set according to an operation received by the input unit 101. For example, either of the options of "enabled" and "disabled" can be set as the duplex printing setting in the duplex printing setting portion 708. The sheet setting screen 700 illustrated in FIG. 5 indicates that "disabled" is selected or set as the duplex printing setting.

The OK button 709a is used to validate the setting item options edited in the sheet name setting portion 701, the sheet size setting portion 703, the sheet feeding direction setting portion 704, the basis weight setting portion 705, the color setting portion 706, the sheet type setting portion 707, and the duplex printing setting portion 708. Specifically, a depression operation performed with respect to the OK button 709a at the input unit 101 causes the setting item options edited in the sheet name setting portion 701, the sheet size setting portion 703, the sheet feeding direction setting portion 704, the basis weight setting portion 705, the color setting portion 706, the sheet type setting portion 707, and the duplex printing setting portion 708 to be stored as the settings in the administration storage unit 104.

The cancel button 709b is used to cancel the setting item options edited in the sheet name setting portion 701, the sheet size setting portion 703, the sheet feeding direction setting portion 704, the basis weight setting portion 705, the color setting portion 706, the sheet type setting portion 707, and the duplex printing setting portion 708. For example, a depression operation performed with respect to the cancel button 709b at the input unit 101 may cause the setting item options edited in the sheet name setting portion 701, the sheet size setting portion 703, the sheet feeding direction setting portion 704, the basis weight setting portion 705, the color setting portion 706, the sheet type setting portion 707, and the duplex printing setting portion 708 to be reset to a preceding setting.

It is to be here noted that the term "setting" mentioned above refers to the setting option selected and validated in each of the setting items of the print settings. The term "option" mentioned above refers to setting options that can be selected in each of the setting items of the print settings. Thus, the "option" embraces the "setting". For example, the "options" for the sheet type as the setting item include "plain paper", "label sheet", "tracing paper", "OHP sheet", and "index paper".

Figure 7A:
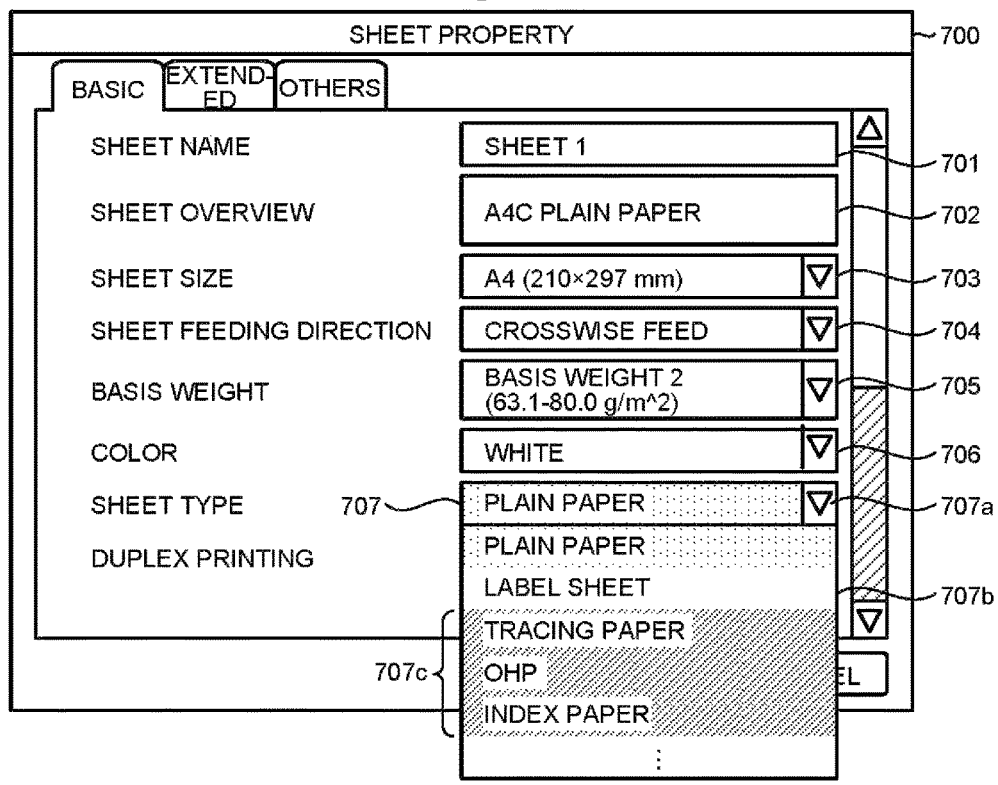
FIGS. 7A and 7B are diagrams illustrating exemplary displays of options that are set to be prohibited from being selected and an incompatible setting condition associated therewith in the sheet setting screen according to the first embodiment.
Figure 7B:
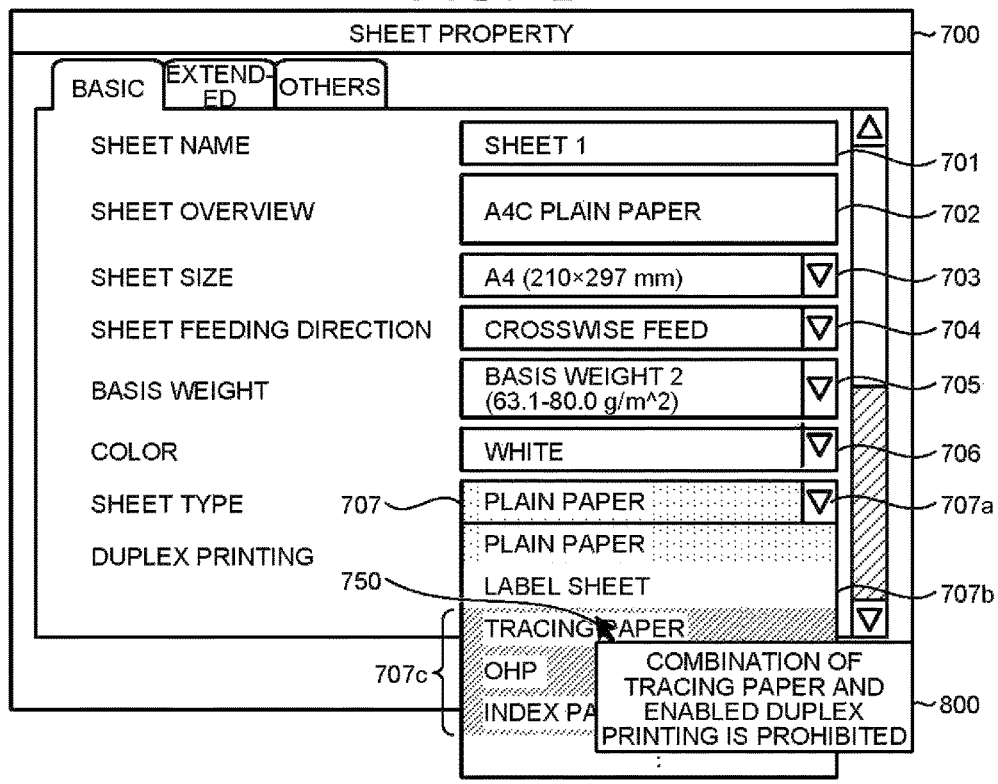

FIGS. 6A and 6B are diagrams illustrating an exemplary operation performed for changing an option of a setting item in the sheet setting screen according to the first embodiment. FIGS. 7A and 7B are diagrams illustrating exemplary displays of options that have been set to be prohibited from being selected and an incompatible setting condition associated therewith in the sheet setting screen according to the first embodiment. The following describes, with reference to FIGS. 6A and 6B, and 7A and 7B, an exemplary operation performed for editing an option of a setting item of the print settings and an exemplary operation for processing the incompatible setting in the sheet setting screen 700.

FIGS. 6A and 6B illustrate the operation performed for editing the setting of the duplex printing among other setting items of the print settings. As illustrated in FIG. 6A, the user first uses the input unit 101 to depress a pull-down button 708a at the duplex printing setting portion 708 on the sheet setting screen 700 to thereby display a pull-down portion 708b that displays options to be set for the duplex printing. Specifically, when the pull-down button 708a is depressed at the input unit 101, the display control unit 103 displays the pull-down portion 708b in which "enabled" and "disabled" as the options to be set for the duplex printing are displayed.

It is noted that, as illustrated in FIG. 6A, the display control unit 103, after having displayed the pull-down portion 708b, may, for example, cause the duplex printing setting portion 708 that displays in color or in reverse display "disabled" as the currently made setting, to thereby indicate that the setting of the duplex printing of the duplex printing setting portion 708 is being edited. Alternatively, as illustrated in FIG. 6A, the display control unit 103 may, for example, display in color or in reverse display the display portion of "disabled" as the setting, of the options to be set for the duplex printing displayed in the pull-down portion 708b. These arrangements are applicable to other setting items.

The user next uses the input unit 101 to select "enabled" from among the options to be set for the duplex printing displayed in the pull-down portion 708b, to thereby display "enabled" in the duplex printing setting portion 708 as illustrated in FIG. 6B. Specifically, when the input unit 101 selects "enabled" as the option displayed in the pull-down portion 708b, the display control unit 103 displays "enabled" in the duplex printing setting portion 708. At this time, "enabled" as the option displayed in the duplex printing setting portion 708 is only temporarily displayed and is yet to be a validated setting.

When details of a setting item in the print settings are changed (edited) as described above, the extracting unit 102a of the incompatible setting processing unit 102 refers to the incompatible setting condition table 600 stored in the administration storage unit 104 and extracts, with respect to the changed option, an option of another setting item satisfying the incompatible setting condition specified by the incompatible setting condition table 600. Specifically, to respond to the change made from "disabled" to "enabled" for the option of the duplex printing setting in the duplex printing setting portion 708, the extracting unit 102a refers to the incompatible setting condition table 600 and, with respect to the newly set "enabled", extracts an option of another setting item satisfying the incompatible setting condition. In practice, the extracting unit 102a extracts an option of a setting item satisfying the incompatible setting condition, with respect to each of the options (including the settings) of each setting item displayed on the sheet setting screen 700. As indicated by the incompatible setting condition table 600 illustrated in FIG. 4, a combination of "enabled" as the option of the duplex printing setting and "tracing paper", "OHP sheet", or "index paper" as the option of the sheet type satisfies the incompatible setting condition. Thus, the extracting unit 102a extracts "tracing paper", "OHP sheet", and "index paper" as the options of the sheet type that satisfy the incompatible setting condition with respect to the newly set "enabled" as the option for the duplex printing setting.

FIGS. 7A and 7B illustrate an operation performed for editing the sheet type among other setting items of the print settings. As illustrated in FIG. 7A, the user uses the input unit 101 to depress a pull-down button 707a of the sheet type setting portion 707 to thereby display a pull-down portion 707b that displays options to be set for the sheet type. Specifically, when the pull-down button 707a is depressed at the input unit 101, the display control unit 103 displays the pull-down portion 707b in which "plain paper", "label sheet", "tracing paper", "OHP sheet", "index paper", and the like as the options to be set for the sheet type are displayed.

Of the options to be selected for the sheet type displayed in the pull-down portion 707b, the display control unit 103 displays the display portion of "tracing paper", "OHP sheet", and "index paper" extracted by the extracting unit 102a as the options of the sheet type satisfying the incompatible setting condition with respect to "enabled" as the option of the duplex printing setting to appear shaded (grayed out), as indicated, for example, by selection prohibited contents 707c. The prohibiting unit 102b of the incompatible setting processing unit 102 sets to prohibit selection by the input unit 101 of the options of the setting item extracted by the extracting unit 102a, specifically, the options that are displayed to appear shaded by the display control unit 103. By displaying the options that have been set to be prohibited from being selected to appear shaded, it can be clearly indicated that the option of the setting item satisfying the incompatible setting condition cannot be selected. Meanwhile, the user can operate the input unit 101 to select, from among the options for the sheet type displayed in the pull-down portion 707b, any option other than the options that are displayed to appear shaded by the display control unit 103, specifically, the options that have been set to be prohibited from being selected by the prohibiting unit 102b. The mode of displaying the options in the selection prohibited contents 707c to appear shaded is not the only possible arrangement. The mode of displaying the selection prohibited contents 707c is required only to allow the user to readily recognize that the selection is prohibited.

Reference is now made to FIG. 7B. When the user, for example, operates the input unit 101 to align a cursor 750 with an option in the selection prohibited contents 707c and select the option (e.g., a clicking operation), the display control unit 103 refers to the incompatible setting condition table 600 and displays, near the cursor 750, a message display portion 800 that contains a display character string associated with the incompatible setting condition corresponding to the option selected by the input unit 101. Specifically, consider, for example, a case in which, as illustrated in FIG. 7B, the user uses the input unit 101 to align the cursor 750 with, and select, "tracing paper" as the option that has been set to be prohibited from being selected by the prohibiting unit 102b. In this case, the display control unit 103 acquires, from the incompatible setting condition table 600, an incompatible setting condition corresponding to "tracing paper", specifically, a display character string of "a combination of tracing paper and enabled duplex printing is prohibited" that is associated with the combination of "tracing paper" for the sheet type and "enabled" for the duplex printing setting. The display control unit 103 thereby displays the message display portion 800 that contains the abovementioned display character string. The message display portion 800, being caused to appear near the cursor 750, specifically, near the option of the selection prohibited contents 707c with which the cursor 750 is aligned, enables ready recognition of the incompatible setting condition as a message. The term "near", as used herein, refers to a position within a predetermined range in which association with the option indicated by the cursor 750 can be recognized.

It has been described that, when the user operates the input unit 101 to align the cursor 750 with an option in the selection prohibited contents 707c and select the option, the display control unit 103 displays the message display portion 800 that contains the display character string associated with the incompatible setting condition corresponding to the selected option. This is, however, not the only possible arrangement. Alternatively, for example, when the user operates the input unit 101 to align the cursor 750 with an option in the selection prohibited contents 707c, the display control unit 103 may display the message display portion 800 that contains the display character string associated with the incompatible setting condition corresponding to that specific option. It should, however, be noted that the concept of the "selection using the input unit 101" includes both of the following two cases: one in which the user operates the input unit 101 to align the cursor 750 with an option in the selection prohibited contents 707c and select (e.g., by clicking) the option; and the other in which the user operates the input unit 101 to simply align the cursor 750 with an option in the selection prohibited contents 707c.

As described above, with respect to the options of each setting item displayed on the sheet setting screen 700, when those options of the setting items satisfying the incompatible setting condition are extracted and selection of these options is set to be prohibited, and when an operation is performed to select any of the selection prohibited options, a message indicating the corresponding incompatible setting condition is displayed. These arrangements clarify that the options of the setting items satisfying the incompatible setting condition cannot be selected and present the incompatible setting condition in the form of a message, so that a relation between the options that constitute an incompatible setting condition is intuitively understandable and a method for resolving the incompatible setting condition can be clearly identified. For example, in the example of the message display portion 800 described with reference to FIG. 7B above, the display of the message display portion 800 enables recognition that, to select "tracing paper" for the sheet type, the duplex printing setting of "enabled" needs to be changed, specifically, the duplex printing setting needs to be changed to "disabled" to thereby cancel the incompatible setting condition.

If the input unit 101 and the display unit 105 are achieved by a touch panel, the display control unit 103 is required only to display the message display portion 800 that describes the incompatible setting condition at a position near a touch portion when the user touches the touch panel to select an option in the selection prohibited contents 707c using the input unit 101.

Figure 8A:
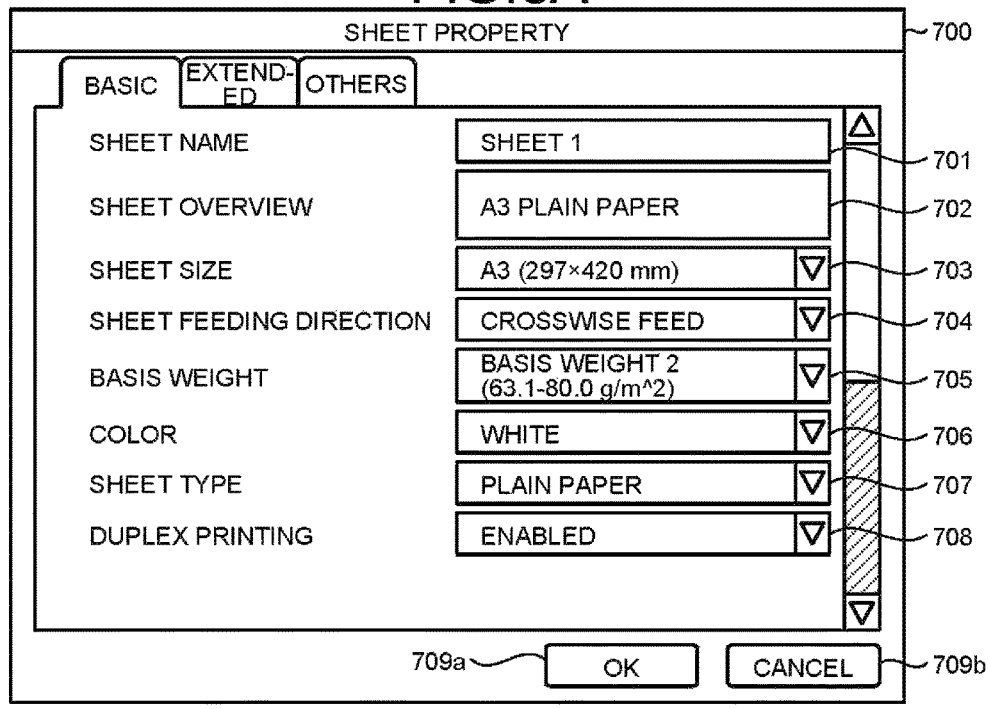
FIGS. 8A and 8B are diagrams illustrating exemplary displays of options that are set to be prohibited from being selected and a plurality of incompatible setting conditions associated therewith in the sheet setting screen according to the first embodiment.
Figure 8B:
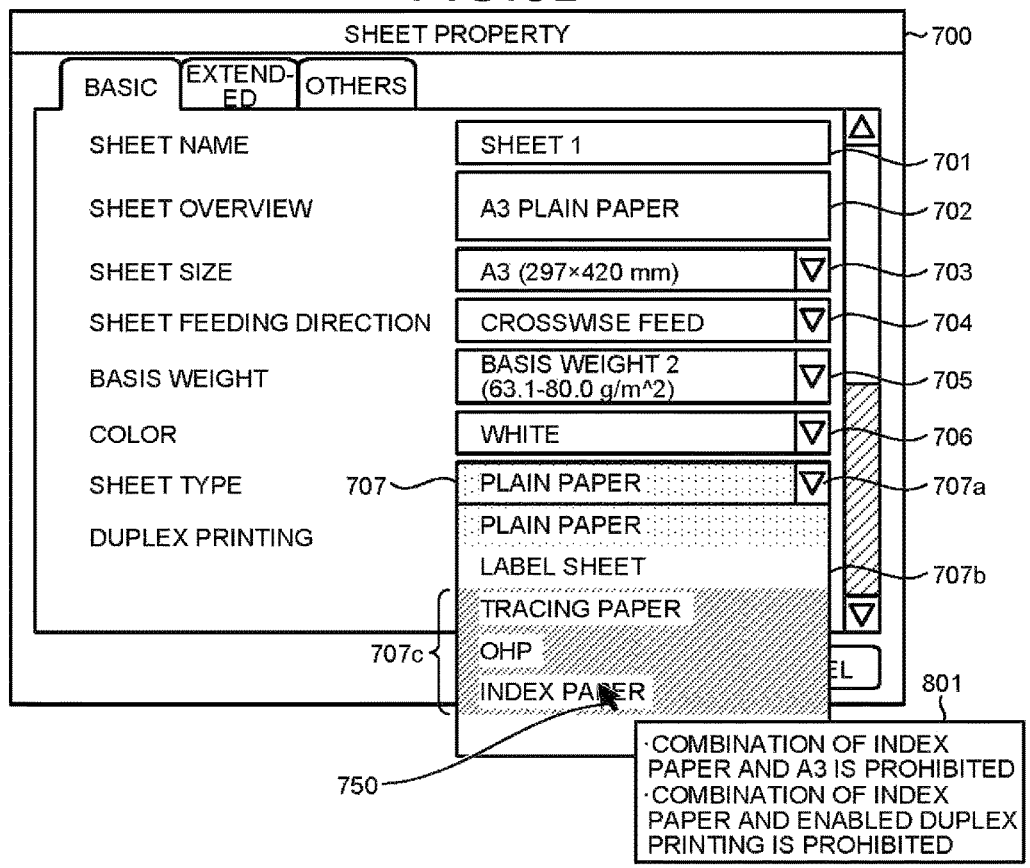

FIGS. 8A and 8B are diagrams illustrating exemplary displays of options that have been set to be prohibited from being selected and a plurality of incompatible setting conditions associated therewith in the sheet setting screen according to the first embodiment. The following describes with reference to FIGS. 8A and 8B an exemplary operation to be performed for processing incompatible setting conditions when a plurality of incompatible setting conditions are displayed in the sheet setting screen 700.

FIGS. 8A and 8B illustrate an operation to be performed when the sheet type is to be edited after the sheet size among other setting items of the print settings has been changed. FIG. 8A illustrates a condition in which, after the duplex printing setting has been changed to "enabled" as illustrated in FIG. 6B, the user uses the input unit 101 to change the sheet size from, for example, "A4 (210×297 mm)" to "A3 (297×420 mm)" in the sheet size setting portion 703 of the sheet setting screen 700. It is noted that "A3 (297×420 mm)" as the option displayed in the sheet size setting portion 703 is only temporarily displayed and is yet to be a validated setting.

When the option of the setting item (the sheet size in FIG. 8A) of the print settings is changed (edited), the extracting unit 102a refers to the incompatible setting condition table 600 stored in the administration storage unit 104 and extracts, with respect to the changed option, an option of another setting item satisfying the incompatible setting condition specified by the incompatible setting condition table 600. Specifically, because the option of the sheet size has been changed from "A4 (210×297 mm)" to "A3 (297×420 mm)" in the sheet size setting portion 703, the extracting unit 102a refers to the incompatible setting condition table 600 and extracts, with respect to each of the options (including the settings) of each setting item displayed on the sheet setting screen 700, options of setting items satisfying the incompatible setting conditions. As described above, the extracting unit 102a extracts "tracing paper", "OHP sheet", and "index paper" that constitute the options of the sheet type satisfying the incompatible setting condition with respect to "enabled" as the option for the duplex printing setting. The extracting unit 102a further extracts an option of another setting item satisfying the incompatible setting condition with respect to the newly set "A3 (297×420 mm)". As illustrated in the incompatible setting condition table 600 in FIG. 4, an incompatible setting condition is satisfied by a combination of an option that is none of "A4", "letter", and "legal" as the sheet size ("A3" for example) and "index paper" as the option of the sheet type. Thus, the extracting unit 102a extracts "index paper" that represents the option of the sheet type satisfying the incompatible setting condition with respect to "A3 (297×420 mm)" as the newly set option of the sheet size.

As illustrated in FIG. 8B, the user uses the input unit 101 to depress the pull-down button 707a at the sheet type setting portion 707 to thereby display the pull-down portion 707b that lists the options of the sheet type. Specifically, as described earlier, when the pull-down button 707a is depressed at the input unit 101, the display control unit 103 displays the pull-down portion 707b in which "plain paper", "label sheet", "tracing paper", "OHP sheet", "index paper", and the like as the options for the sheet type are displayed.

As described above, of the options to be selected for the sheet type displayed in the pull-down portion 707b, the display control unit 103 displays the display portion of "tracing paper", "OHP sheet", and "index paper" extracted by the extracting unit 102a as the options of the sheet type satisfying the incompatible setting condition with respect to "enabled" as the option of the duplex printing setting to appear shaded, as indicated by the selection prohibited contents 707c. As described above, the display control unit 103 further displays, of the options to be selected for the sheet type displayed in the pull-down portion 707b, the display portion of "index paper" extracted by the extracting unit 102a as the option of the sheet type satisfying the incompatible setting condition with respect to "A3 (297×420 mm)" as the option of the sheet size to appear shaded. It is here noted that the display portion of "index paper" in the pull-down portion 707b has already been displayed to appear shaded as described above. This signifies presence of a plurality of options satisfying the incompatible setting condition ("A3" as the sheet size and "enabled" as the duplex printing setting) with respect to "index paper" as the option for the sheet type.

The prohibiting unit 102b sets to prohibit selection by the input unit 101 of the options of the setting item extracted by the extracting unit 102a, specifically, the options that are displayed to appear shaded by the display control unit 103.

Reference is now made to FIG. 8B. When the user, for example, operates the input unit 101 to align the cursor 750 with an option in the selection prohibited contents 707c and select the option, the display control unit 103 refers to the incompatible setting condition table 600 and displays, near the cursor 750, a message display portion 801 that contains display character strings associated with the incompatible setting conditions corresponding to the option selected by the input unit 101. Specifically, consider, for example, a case in which, as illustrated in FIG. 8B, the user uses the input unit 101 to align the cursor 750 with, and select, "index paper" as the option that has been set to be prohibited from being selected by the prohibiting unit 102b. In this case, the display control unit 103 acquires, from the incompatible setting condition table 600, the incompatible setting condition corresponding to "index paper", specifically, a display character string of "a combination of index paper and enabled duplex printing is prohibited" that is associated with the combination of "index paper" for the sheet type and "enabled" for the duplex printing setting. The display control unit 103 further acquires, from the incompatible setting condition table 600, another incompatible setting condition corresponding to "index paper", specifically, a display character string of "a combination of index paper and  is prohibited" that is associated with the combination of "index paper" for the sheet type and "A3" for the sheet type. Wherein, the characters "" in the display character string represent wild cards and the display control unit 103 acquires a display character string of "a combination of index paper and A3 is prohibited" in which "**" in the display character string is substituted for a character string of "A3" that satisfies the Boolean expression of the sheet size specified in the incompatible setting condition table 600 illustrated in FIG. 4. The display control unit 103 thereby displays the message display portion 801 that contains a plurality of display character strings specifying the incompatible setting conditions displayed in parallel, specifically, "a combination of index paper and enabled duplex printing is prohibited" and "a combination of index paper and A3 is prohibited".

As described above, when a plurality of incompatible setting conditions corresponding to options that are set to be prohibited from being selected exist and when an operation is performed to select the options that are set to be prohibited from being selected, a plurality of messages specifying incompatible setting conditions are displayed simultaneously. A relation between the options that constitute an incompatible setting condition is thus even more intuitively understandable and all methods for resolving the incompatible setting conditions can be clearly identified.

Incompatible Setting Processing Operation Flowchart

FIG. 9 is a flowchart illustrating exemplary operations performed in incompatible setting processing in the information processing apparatus according to the first embodiment. The following describes with reference to FIG. 9 steps to be followed by the PC 100 during its performance of the incompatible setting processing.

Step S11

When the display control unit 103 starts the sheet setting screen 700 (displayed on the display unit 105) or if the display control unit 103 determines that details of a setting item of the print settings in the sheet setting screen 700 are changed through the input unit 101 (Yes at Step S11), the operation proceeds to Step S12. If the display control unit 103 otherwise determines (No at Step S11), the operation proceeds to Step S15.

Step S12

The extracting unit 102a of the incompatible setting processing unit 102 refers to the incompatible setting condition table 600 and extracts, with respect to the option (including the setting) of each setting item displayed in the sheet setting screen 700, an option (a first option) of another setting item satisfying an incompatible setting condition. If the option of the other setting item extracted by the extracting unit 102a exists (Yes at Step S12), the operation proceeds to Step S13. If the option of the other setting item extracted by the extracting unit 102a does not exist (No at Step S12), the operation proceeds to Step S14.

Step S13

The prohibiting unit 102b of the incompatible setting processing unit 102 sets to prohibit selection (disables selection) by the input unit 101 of the option of the setting item extracted by the extracting unit 102a. When the input unit 101 pulls down a setting item in the sheet setting screen 700, the display control unit 103 displays the display portion of the option that has been set to be prohibited from being selected by the prohibiting unit 102b to appear shaded, out of the options displayed in the pull-down portion of the setting item. The operation then proceeds to Step S14.

Step S14

The incompatible setting processing unit 102 determines whether the extraction of the options satisfying the incompatible setting condition has been completed for each of all options of all setting items displayed in the sheet setting screen 700. If the extraction of the options satisfying the incompatible setting condition has been completed for each of all options of all setting items (Yes at Step S14), the operation proceeds to Step S15. If the extraction of the options satisfying the incompatible setting condition is yet to be completed (No at Step S14), the operation returns to Step S12.

Step S15

If the user uses the input unit 101 to align the cursor 750 with, and select, the option that has been set to be prohibited from being selected by the prohibiting unit 102b and displayed in the pull-down portion (Yes at Step S15), the operation proceeds to Step S16. If the user does not operate to select the option (No at Step S15), the incompatible setting processing operation is terminated.

Step S16

If the user uses the input unit 101 to align the cursor 750 with, and select, an option in the selection prohibited contents 707c, the display control unit 103 refers to the incompatible setting condition table 600 and displays, near the cursor 750, the message display portion that contains at least one display character string associated with the incompatible setting condition corresponding to the option selected by the input unit 101. This completes the incompatible setting processing operations.

As described above, with respect to the options of each setting item displayed on the sheet setting screen 700, those options of the setting items satisfying the incompatible setting condition are extracted and selection of these options is set to be prohibited; and when an operation is performed to select any of the selection prohibited options, a message indicating the corresponding incompatible setting condition is displayed. These arrangements clarify that the options of the setting items satisfying the incompatible setting condition cannot be selected and present the incompatible setting condition in the form of a message, so that a relation between the options that constitute an incompatible setting condition is intuitively understandable and a method for resolving the incompatible setting condition can be clearly identified.

When a plurality of incompatible setting conditions corresponding to options that are set to be prohibited from being selected exist and when an operation is performed to select the options that are set to be prohibited from being selected, a plurality of messages specifying incompatible setting conditions are displayed simultaneously. A relation between the options that constitute an incompatible setting condition is thus even more intuitively understandable and all methods for resolving the incompatible setting conditions can be clearly identified.

Modification

Figure 10:
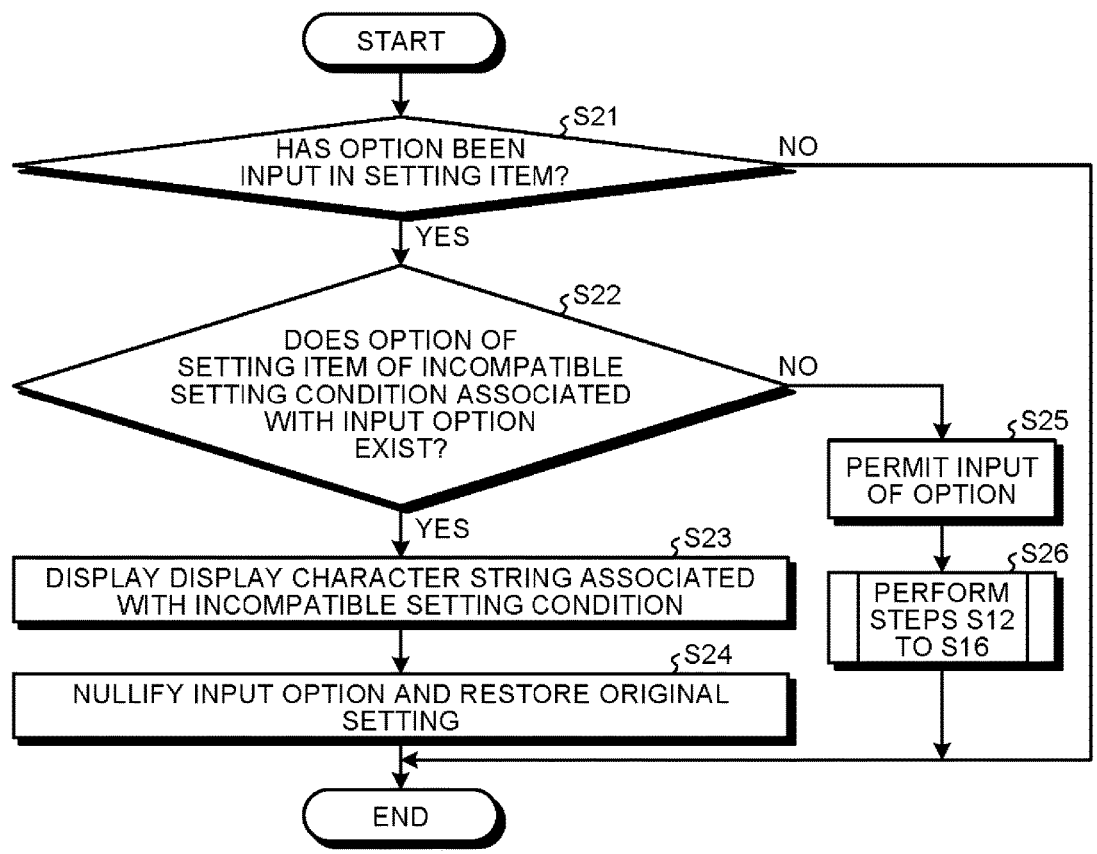
FIG. 10 is a flowchart illustrating exemplary operations performed in incompatible setting processing in the information processing apparatus according to a modification of the first embodiment.

FIG. 10 is a flowchart illustrating exemplary operations performed in incompatible setting processing in an information processing apparatus according to a modification of the first embodiment. The following describes with reference to FIG. 10 incompatible setting processing to be performed when, during a setting item editing procedure on the sheet setting screen 700, directly inputting an option of a setting item, instead of selecting the option displayed in the pull-down portion as described above.

Step S21

If the display control unit 103 determines that the input unit 101 directly inputs an option of a setting item in the print settings on the sheet setting screen 700 (Yes at Step S21), the operation proceeds to Step S22. If the display control unit 103 otherwise determines, the incompatible setting processing operation is terminated.

Step S22

The extracting unit 102a of the incompatible setting processing unit 102 refers to the incompatible setting condition table 600 and extracts, with respect to the option (a second option) directly input by the input unit 101, an option (a third option) of the setting item satisfying the incompatible setting condition, of the setting items in the sheet setting screen 700. If the option of the setting item extracted by the extracting unit 102a exists (Yes at Step S22), the operation proceeds to Step S23. If the option of the setting item extracted by the extracting unit 102a does not exist (No at Step S22), the operation proceeds to Step S25.

Step S23

The display control unit 103 refers to the incompatible setting condition table 600 and displays, near, for example, the display portion of the input option, the message display portion that contains at least one display character string associated with the incompatible setting condition corresponding to the option input by the input unit 101. The operation then proceeds to Step S24.

Step S24

The display control unit 103 nullifies the option input by the input unit 101, restoring the original setting. The incompatible setting processing operation is thereby terminated. The nullifying the input option and restoring the original setting is not the only possible approach. Another possible approach may be such that, while the input option in question is left as-is, it is encircled by a red frame and an alarm icon is displayed to thereby warn that an incompatible setting condition has occurred, or the OK button 709a is displayed dimmed to indicate that the OK button 709a is being unavailable. This approach of leaving the input option as-is and canceling the incompatible setting condition by changing an option that constitutes with the input option the incompatible setting condition allows the input option to be accepted, so that user operability can be enhanced.

Step S25

The incompatible setting processing unit 102 permits the input of the option by the input unit 101. The operation then proceeds to Step S26.

Step S26

The PC 100 performs the same steps as those of Steps S12 to S16 illustrated in FIG. 9. The incompatible setting processing operation is then terminated.

As described above, even when an option of a setting item in the print settings as illustrated in FIGS. 6A and 6B through 8A and 8B is directly input, instead of the option being selected, an option of a setting item satisfying the incompatible setting condition is extracted. If the extracted option exists, a message indicating the incompatible setting condition is displayed and the input option is nullified. These arrangements clarify that the options of the setting items satisfying the incompatible setting condition cannot be input and present the incompatible setting condition in the form of a message, so that a relation between the options that constitute an incompatible setting condition is intuitively understandable and a method for resolving the incompatible setting condition can be clearly identified.

The incompatible setting processing according to the first embodiment has been described for the print settings in the printing system 1. The incompatible setting processing can nonetheless be applied to setting items of any settings in which incompatible setting conditions can occur other than the print settings.

Details of the incompatible setting conditions and the display character strings listed in the incompatible setting condition table 600 illustrated in FIG. 4 are illustrative only. An arrangement may, for example, be made to permit editing of the details of the incompatible setting conditions and the display character strings listed in the incompatible setting condition table 600 through operations performed with the input unit 101 by the user.

Second Embodiment

The following describes a printing system according to a second embodiment of the present invention, particularly main differences from the printing system 1 according to the first embodiment. The printing system according to the second embodiment has the same general configuration as the printing system 1 of the first embodiment and a PC 100 of the second embodiment has the same hardware configuration as the PC 100 of the first embodiment.

Functional Block Configuration of Information Processing Apparatus

The PC 100 of the second embodiment has the same functional block configuration as that in the first embodiment illustrated in FIG. 3. The following describes operations of each functional block of the PC 100 according to the second embodiment.

An input unit 101 (input unit) functions to receive an operation performed by a user and generate an operating signal. The input unit 101 is achieved by, for example, the keyboard 507 or the mouse 508 illustrated in FIG. 2.

An incompatible setting processing unit 102 functions to extract an option of a setting item satisfying an incompatible setting condition specified by an incompatible setting condition table 600a stored in an administration storage unit 104. The incompatible setting processing unit 102 includes an extracting unit 102a (extracting unit) and a prohibiting unit 102b (prohibiting unit). The incompatible setting processing unit 102 is achieved by a program executed by the CPU 501 illustrated in FIG. 2.

When, for example, details of a setting item in the print settings are changed (edited), the extracting unit 102a functions to extract an option of another setting item satisfying the incompatible setting condition specified by the incompatible setting condition table 600a with respect to the changed option. The prohibiting unit 102b functions to set to prohibit selection of, or hide, the option of the setting item extracted by the extracting unit 102a in accordance with a selection choice (to be described later) associated in the incompatible setting condition table 600a.

When the option of the setting item that has been set to be prohibited from being selected as a result of the extraction by the incompatible setting processing unit 102 is selected by the input unit 101, a display control unit 103 functions to acquire from the incompatible setting condition table 600a illustrated in FIG. 11 to be described later a display character string of the incompatible setting condition associated with the item and to display the display character string on the display unit 105. The display control unit 103 is achieved by a program executed by the CPU 501 illustrated in FIG. 2.

The administration storage unit 104 stores therein, for example, the settings of the setting items in the print settings and the incompatible setting condition table 600a. The administration storage unit 104 is achieved by the external storage device 504 illustrated in FIG. 2.

A display unit 105 displays, for example, an application screen and a setting screen under control by the display control unit 103. The display unit 105 is achieved by the display 505 illustrated in FIG. 2.

Incompatible Setting Condition Table

FIG. 11 is a table illustrating an exemplary configuration of the incompatible setting condition table according to the second embodiment. The following describes with reference to FIG. 11 the configuration of the incompatible setting condition table 600a.

The incompatible setting condition table 600a (incompatible setting condition information) illustrated in FIG. 11 is an exemplary table that specifies combinations of options that cannot be simultaneously set (incompatible setting conditions) because of, for example, technical or logical factors involved in the options of various setting items in the print settings. The incompatible setting condition table 600a further associates the combinations (incompatible setting conditions) with respective display character strings and processing choices. The term "processing choice", as used herein, refers to flag information that determines whether processing of the selection prohibited state or processing of hiding is to be performed with respect to a setting of a setting item satisfying the incompatible setting condition. The processing of the selection prohibited state and the processing of the hiding performed by the prohibiting unit 102b will be described later.

The incompatible setting condition table 600a illustrated in FIG. 11 includes as the setting items for the print settings, for example, "setting item (1) (sheet size), "setting item (2)" (sheet feeding direction), "setting item (3)" (basis weight), "setting item (4)" (color), "setting item (5)" (sheet type), "setting item (6)" (duplex printing), "setting item (7)" (number of tabs), and "setting item (8)" (tab width).

An example of the incompatible setting condition includes a combination of "tracing paper", "OHP sheet", or "index paper" as the sheet type and "enabled" duplex printing as illustrated in FIG. 11. This combination constitutes an incompatible setting condition. Specifically, the setting of "tracing paper", "OHP sheet", or "index paper" for the sheet type is not compatible with a setting of "enabled" for duplex printing.

A combination of "A4" for the sheet size, "lengthwise feed" for the sheet feeding direction, and "index paper" for the sheet type constitutes another incompatible setting condition. The processing choice associated with this incompatible setting condition is "0" (selection prohibited state). On the basis that the display character string associated with this incompatible setting condition is "A combination of index paper, A4, and lengthwise feed is prohibited", the prohibiting unit 102b performs the processing of the selection prohibited state.

The incompatible setting condition table 600a specifies, for example, "ALL" when to control all options that a setting item can assume. For example, as illustrated in FIG. 11, a combination of "other than index paper" (NOT (index paper)) for the sheet type and each of all options of the number of tabs and the tab width constitutes an incompatible setting condition. The processing choice associated with this incompatible setting condition is "1" (hidden) and the prohibiting unit 102b performs the processing of the hiding. In addition, the use of the description of "ALL" eliminates, for example, the need for preparing records of incompatible setting conditions enumerating all possible options of the number of tabs and the tab width.

The setting items for the print settings in the printing system according to the second embodiment are not limited only to those included in the incompatible setting condition table 600a illustrated in FIG. 11 given for illustrative purposes only.

In addition, the method for storing association among the incompatible setting conditions (combinations of options of setting items incompatible with each other), the display character strings, and the processing choices is not limited only to the method using the incompatible setting condition table 600a illustrated in FIG. 11. The method is required only to be capable of associating one with another in the similar manner.

Overview of Incompatible Setting Condition Table and Incompatible Setting Processing A sheet setting screen 700 (setting screen) displayed on the display unit 105 has the same configuration as that illustrated in FIG. 5. The sheet setting screen 700 in the second embodiment, however, further includes a number-of-tabs setting portion 710 and a tab width setting portion 711.

The number-of-tabs setting portion 710 is a portion in which the number of tabs of the index sheet is set through an operation received by the input unit 101. The tab width setting portion 711 is a portion in which a width of the tab of the index sheet is set through an operation received by the input unit 101. The sheet setting screen 700 illustrated in FIG. 14 indicates a condition in which "5" is selected or set for the number of tabs and "15 mm" is selected or set for the tab width.

Figure 12A:
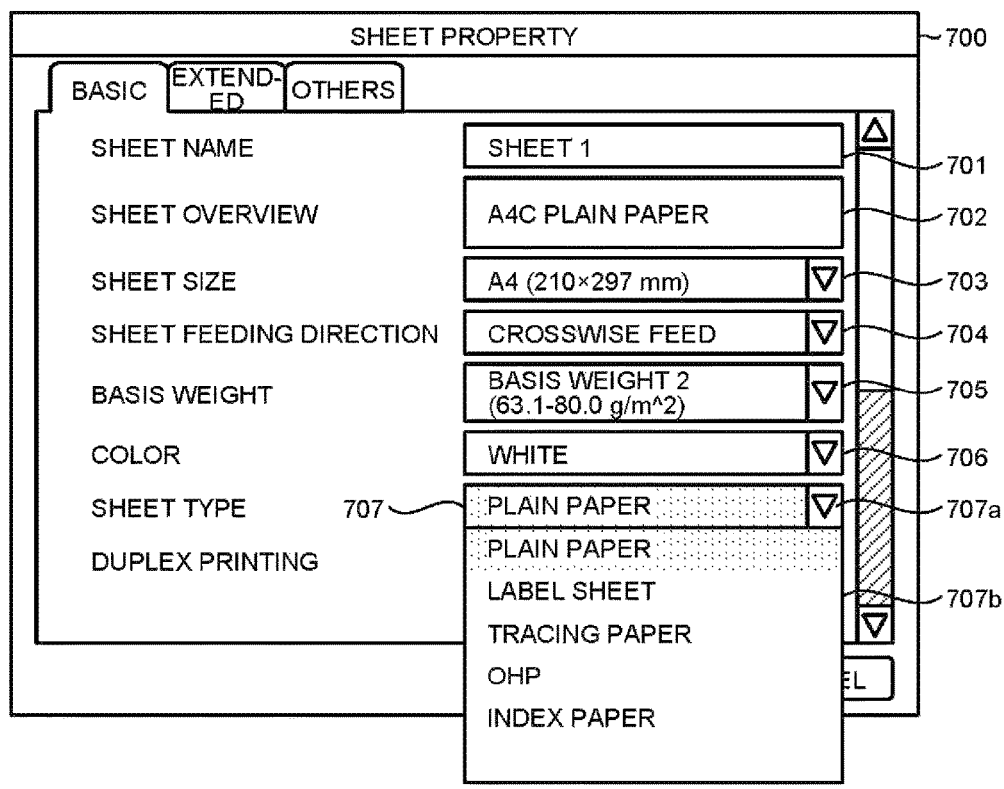
FIGS. 12A and 12B are diagrams illustrating an exemplary operation performed for changing an option of a setting item in a sheet setting screen according to the second embodiment.
Figure 12B:
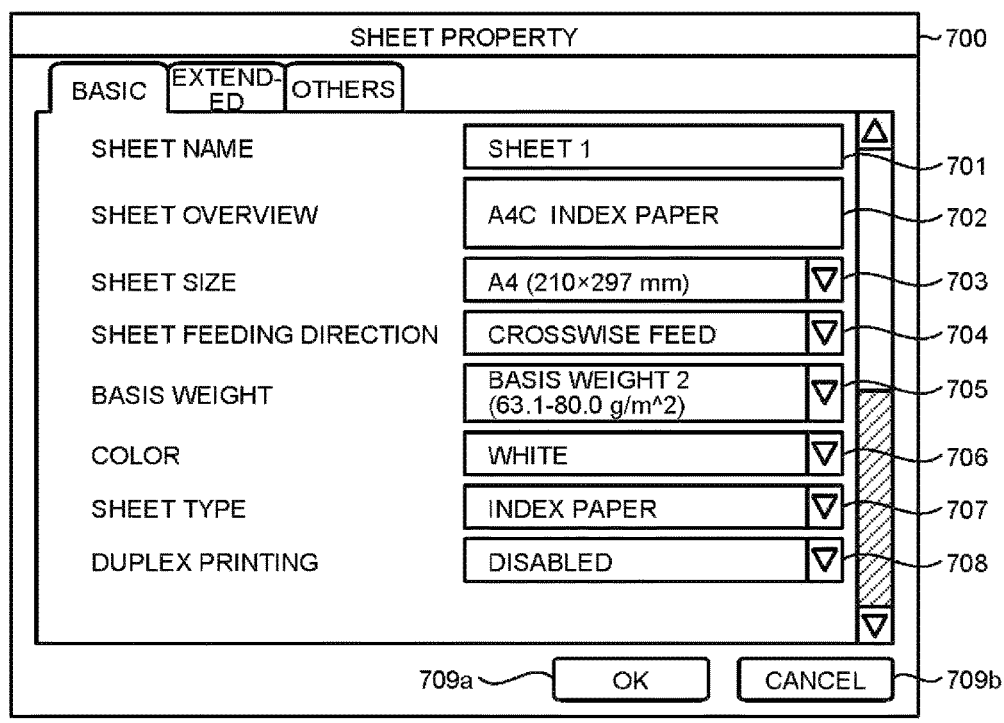
Figure 13A:
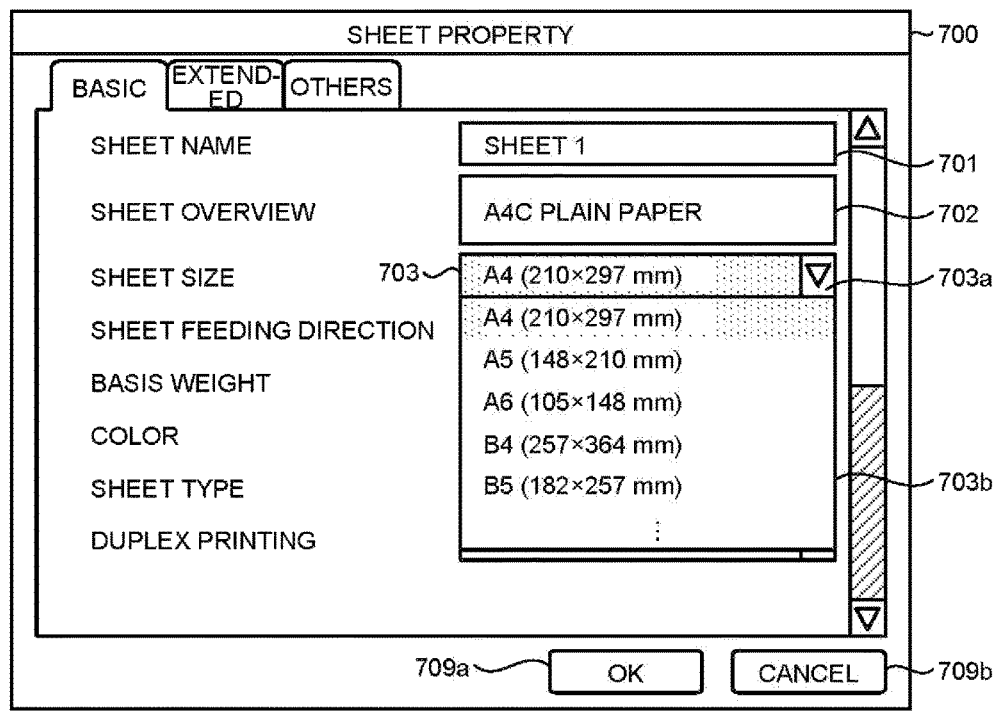
FIGS. 13A and 13B are diagrams illustrating an example where an option corresponding to an incompatible setting condition is hidden in the sheet setting screen according to the second embodiment.
Figure 13B:
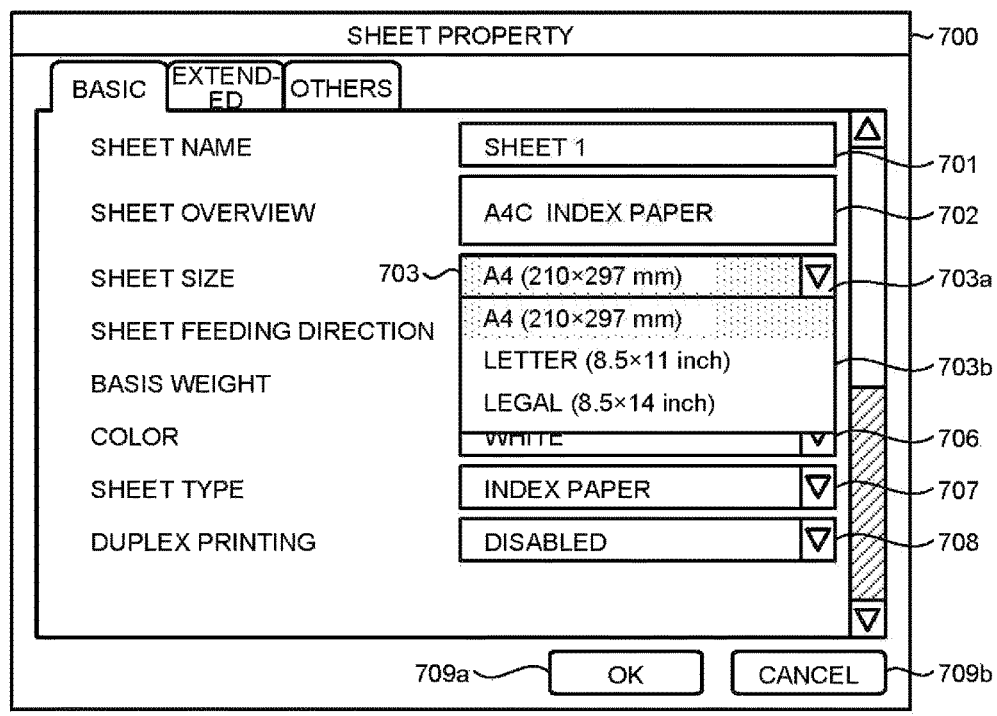
Figure 14:
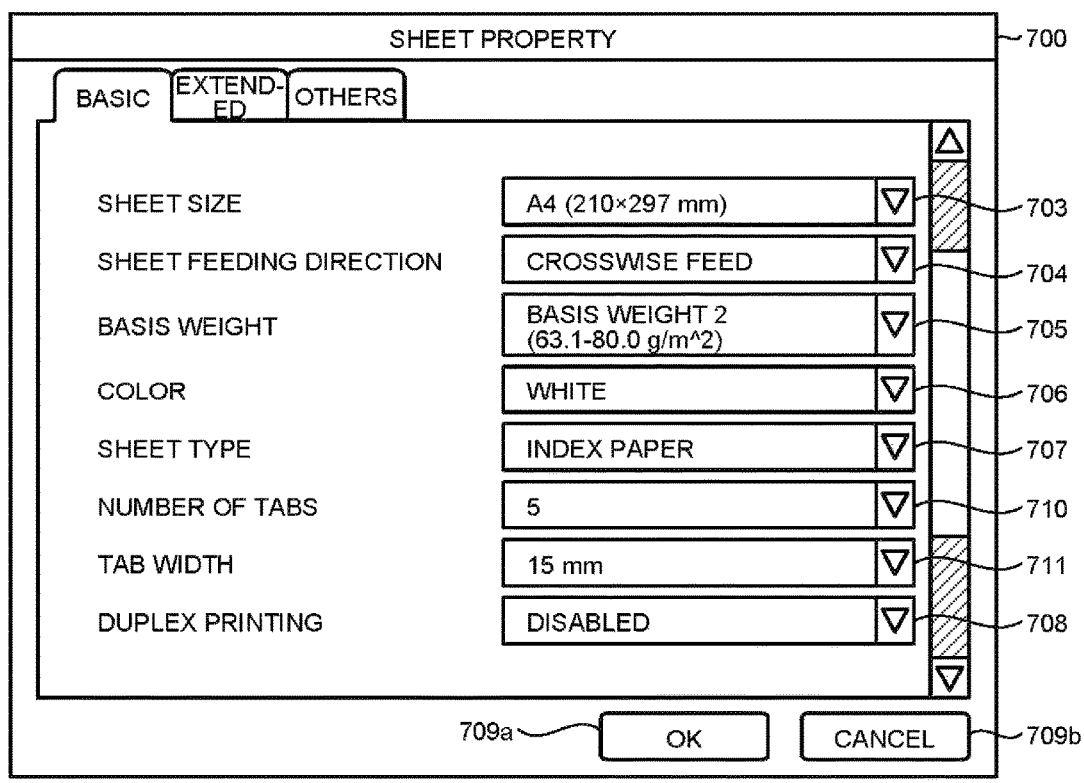
FIG. 14 is a diagram illustrating an example where setting items that do not satisfy the incompatible setting condition are displayed in the sheet setting screen according to the second embodiment.

FIGS. 12A and 12B are diagrams illustrating an exemplary operation performed for changing an option of a setting item in the sheet setting screen according to the second embodiment. FIGS. 13A and 13B are diagrams illustrating an example where an option corresponding to an incompatible setting condition is hidden in the sheet setting screen according to the second embodiment. FIG. 14 is a diagram illustrating an example where setting items that do not satisfy the incompatible setting condition are displayed in the sheet setting screen according to the second embodiment. The following describes, with reference to FIGS. 12A and 12B to 14, an exemplary operation performed for editing an option of a setting item of the print settings and an exemplary operation for processing the incompatible setting in the sheet setting screen 700 in the second embodiment.

FIGS. 12A and 12B illustrate an operation performed for editing the sheet type among other setting items of the print settings. As illustrated in FIG. 12A, the user uses the input unit 101 to depress a pull-down button 707a of a sheet type setting portion 707 to thereby display a pull-down portion 707b that displays options to be set for the sheet type. Specifically, when the pull-down button 707a is depressed at the input unit 101, the display control unit 103 displays the pull-down portion 707b in which "plain paper", "label sheet", "tracing paper", "OHP sheet", "index paper", and the like as the options to be set for the sheet type are displayed.

The user next uses the input unit 101 to select "index paper" from among the options to be set for the sheet type displayed in the pull-down portion 707b, to thereby display "index paper" in the sheet type setting portion 707 as illustrated in FIG. 12B. Specifically, when "index paper" as the option displayed in the pull-down portion 707b is selected by the input unit 101, the display control unit 103 displays "index paper" in the sheet type setting portion 707. Furthermore, in response to the change made in the display contents of the sheet type setting portion 707, the display control unit 103 displays, in an overview display portion 702 that displays a character string that combines the settings of the sheet size, the sheet feeding direction, and the sheet type out of the setting items, a character string of "A4C index paper". At this time, "index paper" as the option displayed in the sheet type setting portion 707 is only temporarily displayed and is yet to be a validated setting.

When details of a setting item in the print settings are changed (edited) as described above, the extracting unit 102a of the incompatible setting processing unit 102 refers to the incompatible setting condition table 600a stored in the administration storage unit 104 and extracts, with respect to the changed option, an option of another setting item satisfying the incompatible setting condition specified by the incompatible setting condition table 600a. Specifically, to respond to the change made from "plain paper" to "index paper" for the option of the sheet type setting in the sheet type setting portion 707, the extracting unit 102a refers to the incompatible setting condition table 600a and, with respect to the newly set "index paper", extracts an option of another setting item satisfying the incompatible setting condition. In practice, the extracting unit 102a extracts an option of a setting item satisfying the incompatible setting condition, with respect to each of the options (including the settings) of each setting item displayed on the sheet setting screen 700. As indicated by the incompatible setting condition table 600a illustrated in FIG. 11, a combination of "index paper" as the option of the sheet type setting and "enabled" as the option of the screen printing satisfies the incompatible setting condition. In addition, a combination of "index paper" as the option of the sheet type setting, "A4" as the option of the sheet size setting, and "lengthwise feed" as the option of the sheet feeding direction setting satisfies the incompatible setting condition. In addition, a combination of "index paper" as the option of the sheet type setting, "letter" as the option of the sheet size setting, and "lengthwise feed" as the option of the sheet feeding direction setting satisfies the incompatible setting condition. In addition, a combination of "index paper" as the option of the sheet type setting and "other than A4, letter, and legal" as the option of the sheet size setting satisfies the incompatible setting condition. Thus, the extracting unit 102a extracts the following options that satisfy respective incompatible setting conditions with respect to "index paper" as the newly set option of the sheet type: "enabled" as the screen printing setting; "A4" as the option of the sheet size setting and "lengthwise feed" as the option of the sheet feeding direction setting; "letter" as the option of the sheet size setting and "lengthwise feed" as the option of the sheet feeding direction setting; and "other than A4, letter, and legal" as the option of the sheet size setting.

FIGS. 13A and 13B illustrate an operation performed for editing the sheet size among other setting items of the print settings. Under the condition of the sheet setting screen 700 illustrated in FIG. 12A (the condition in which "plain paper" is set as the sheet type), the user uses the input unit 101 to depress a pull-down button 703a of a sheet size setting portion 703 as illustrated in FIG. 13A to thereby display a pull-down portion 703b that displays options to be set for the sheet size. Specifically, the extracting unit 102a refers to the incompatible setting condition table 600a stored in the administration storage unit 104 and extracts, with respect to each of the setting items on the sheet setting screen 700 illustrated in FIG. 12A, an option of a setting item satisfying the incompatible setting condition specified in the incompatible setting condition table 600a. Because "plain paper" is set for the setting of the sheet type as in the sheet setting screen 700 illustrated in FIG. 12A, however, the extracting unit 102a refers to the incompatible setting condition table 600a to end up finding no options of setting items satisfying the incompatible setting condition with respect to "plain paper" set for the sheet type setting, that is, there is no options that the extracting unit 102a extracts. Thus, when the pull-down button 703a is depressed through the input unit 101, the display control unit 103 displays the pull-down portion 703b to thereby display all options of the sheet size setting in the pull-down portion 703b (FIG. 13A exemplarily displays "A4", "A5", "A6", "B4", and "B5").

Under the condition of the sheet setting screen 700 illustrated in FIG. 12B (the condition in which "index paper" is set as the sheet type), the user uses the input unit 101 to depress the pull-down button 703a of the sheet size setting portion 703 as illustrated in FIG. 13B to thereby display the pull-down portion 703b that displays options to be set for the sheet size. Specifically, the extracting unit 102a refers to the incompatible setting condition table 600a stored in the administration storage unit 104 and extracts, with respect to each of the setting items on the sheet setting screen 700 illustrated in FIG. 12B, an option of a setting item satisfying the incompatible setting condition specified in the incompatible setting condition table 600a. Because the option of the sheet type setting in the sheet type setting portion 707 has been changed from "plain paper" to "index paper", for example, the extracting unit 102a refers to the incompatible setting condition table 600a and extracts an option of a setting item satisfying the incompatible setting condition with respect to the newly set "index paper". Specifically, the extracting unit 102a extracts the option of "other than A4, letter, and legal" as the option of the sheet size setting satisfying the incompatible setting condition with respect to "index paper" as the option of the sheet type setting. It is noted that, in the sheet setting screen 700 illustrated in FIG. 12B, "crosswise feed" is set for the sheet feeding direction. Thus, the extracting unit 102a does not extract "A4" or "letter" as the option for the sheet size satisfying the incompatible setting condition with respect to "index paper" as the option of the sheet type setting. The prohibiting unit 102b of the incompatible setting processing unit 102 then refers to the incompatible setting condition table 600a stored in the administration storage unit 104 and cause the display control unit 103 not to display, in the pull-down portion 703b, options having a processing choice of "1" (hidden) associated with the corresponding incompatible setting condition out of the options extracted by the extracting unit 102a (processing of the hiding). Specifically, as specified in the incompatible setting condition table 600a, the processing choice associated with the incompatible setting condition of "index paper" for the sheet type and "other than A4, letter, and legal" for the sheet size is "1" (hidden), so that the prohibiting unit 102b causes the display control unit 103 to display "A4", "letter", and "legal" only in the pull-down portion 703b as illustrated in FIG. 13B.

FIG. 14 is a diagram illustrating an example in which setting items in the print settings not satisfying the incompatible setting condition are displayed. Assume that, as described above with reference to FIGS. 12A and 12B, the user uses the input unit 101 to select "index paper" among other options for the sheet type setting displayed in the pull-down portion 707b, to thereby display "index paper" in the sheet type setting portion 707. With the option of the sheet type setting changed from "plain paper" to "index paper" in the sheet type setting portion 707, the extracting unit 102a refers to the incompatible setting condition table 600a and extracts an option of a setting item satisfying the incompatible setting condition with respect to the newly set sheet type. In this case, as illustrated in the incompatible setting condition table 600a illustrated in FIG. 11, a combination of any option other than "index paper" among other options of the sheet type setting, all options of the number of tabs setting (specified as "ALL"), and all options of the tab width setting (specified as "ALL") satisfies an incompatible setting condition. As illustrated in FIG. 14, however, the option of the sheet type setting changed to "index paper" results in no incompatible setting condition being satisfied between "index paper" as the option of the sheet type setting and the options of the number of tabs and the tab width. Thus, the display control unit 103 displays the setting items of the number of tabs and the tab width, and the number-of-tabs setting portion 710 and the tab width setting portion 711 on the sheet setting screen 700 as illustrated in FIG. 14.

Assume this time that, from the condition of the sheet setting screen 700 illustrated in FIG. 14, the user uses the input unit 101 to select "plain paper" from among the options of the sheet type setting displayed in the pull-down portion 707b, to thereby display "plain paper" in the sheet type setting portion 707. With the option of the sheet type setting changed from "index paper" to "plain paper" in the sheet type setting portion 707, the extracting unit 102a refers to the incompatible setting condition table 600a and extracts an option of a setting item satisfying the incompatible setting condition with respect to the newly set sheet type. In this case, as illustrated in the incompatible setting condition table 600a illustrated in FIG. 11, a combination of "plain paper" that represents an option other than "index paper" among other options of the sheet type setting, all options of the number of tabs setting (specified as "ALL"), and all options of the tab width setting (specified as "ALL") satisfies an incompatible setting condition. The prohibiting unit 102b then refers to the incompatible setting condition table 600a stored in the administration storage unit 104 and does not allow the display control unit 103 to display the pull-down portion 703b (processing of the hiding) for, out of the options extracted by the extracting unit 102a, an option having a processing choice of "1" (hidden) associated with the corresponding incompatible setting condition. Specifically, as specified in the incompatible setting condition table 600a, the processing choice associated with the incompatible setting condition of "plain paper" (NOT (index paper)) for the sheet type and "ALL" for the number of tabs and the tab width is "1" (hidden), so that the prohibiting unit 102b does not allow the setting items of the number of tabs and the tab width, and the number-of-tabs setting portion 710 and the tab width setting portion 711 to be displayed in the sheet setting screen 700 as illustrated, for example, in FIG. 5 (processing of the hiding).

With reference to FIGS. 12A and 12B through 14, a description has been made about the processing applicable when the processing choice associated with the incompatible setting condition is "1" (hidden). The processing applicable when the processing choice is "0 (selection prohibited state)" (processing of the selection prohibited state) is the same as that described with reference to the first embodiment.

Incompatible Setting Processing Operation Flowchart

FIG. 15 is a flowchart illustrating exemplary operations performed in incompatible setting processing in the information processing apparatus according to the second embodiment. The following describes with reference to FIG. 15 steps to be followed by the PC 100 during its performance of the incompatible setting processing.

Step S31

When the display control unit 103 starts the sheet setting screen 700 (displayed on the display unit 105) or if the display control unit 103 determines that details of a setting item of the print settings in the sheet setting screen 700 are changed through the input unit 101 (Yes at Step S31), the operation proceeds to Step S32. If the display control unit 103 otherwise determines (No at Step S31), the operation proceeds to Step S37.

Step S32

The extracting unit 102a of the incompatible setting processing unit 102 refers to the incompatible setting condition table 600a and extracts, out of the options of the setting items satisfying the incompatible setting condition (first options) with respect to the option (including the setting) of each setting item displayed in the sheet setting screen 700, an option having a processing choice of "0 (selection prohibited state)" associated with the corresponding incompatible setting condition. If the option of the setting item extracted by the extracting unit 102a exists (Yes at Step S32), the operation proceeds to Step S33. If the option of the setting item extracted by the extracting unit 102a does not exist (No at Step S32), the operation proceeds to Step S34.

Step S33

The prohibiting unit 102b of the incompatible setting processing unit 102 sets to prohibit selection by the input unit 101 of the option of the setting item extracted by the extracting unit 102a (processing of the selection prohibited state). When the input unit 101 pulls down a setting item in the sheet setting screen 700, the display control unit 103 displays the display portion of the option that has been set to be prohibited from being selected by the prohibiting unit 102b to appear shaded, out of the options displayed in the pull-down portion of the setting item. The operation then proceeds to Step S36.

Step S34

The extracting unit 102a of the incompatible setting processing unit 102 refers to the incompatible setting condition table 600a and extracts, out of the options of the setting items satisfying the incompatible setting condition (first options) with respect to the option (including the setting) of each setting item displayed in the sheet setting screen 700, an option having a processing choice of "1" (hidden) associated with the corresponding incompatible setting condition. If the option of the setting item extracted by the extracting unit 102a exists (Yes at Step S34), the operation proceeds to Step S35. If the option of the setting item extracted by the extracting unit 102a does not exist (No at Step S34), the operation proceeds to Step S36.

Step S35

The prohibiting unit 102b of the incompatible setting processing unit 102 performs processing for not allowing the display control unit 103 to display the option of the setting item extracted by the extracting unit 102a in the pull-down portion (processing of the hiding). If the extracting unit 102a extracts the option of the setting item as "ALL", the prohibiting unit 102b hides the setting item and the corresponding setting portion. The operation then proceeds to Step S36.

Step S36

The incompatible setting processing unit 102 determines whether the extraction of the options satisfying the incompatible setting condition has been completed for each of all options of all setting items displayed in the sheet setting screen 700. If the extraction of the options satisfying the incompatible setting condition has been completed for each of all options of all setting items (Yes at Step S36), the operation proceeds to Step S37. If the extraction of the options satisfying the incompatible setting condition is yet to be completed (No at Step S36), the operation returns to Step S32.

Step S37

If the user uses the input unit 101 to align the cursor 750 with, and select, the option that has been set to be prohibited from being selected by the prohibiting unit 102b and displayed in the pull-down portion (Yes at Step S37), the operation proceeds to Step S38. If the user does not operate to select the option (No at Step S37), the incompatible setting processing operation is terminated.

Step S38

If the user uses the input unit 101 to align the cursor 750 with, and select, an option in the selection prohibited contents, the display control unit 103 refers to the incompatible setting condition table 600a and displays, near the cursor 750, a message display portion that contains at least one display character string associated with the incompatible setting condition corresponding to the option selected by the input unit 101. This completes the incompatible setting processing operations.

As described above, with respect to the options of each setting item displayed on the sheet setting screen 700, those options of the setting items satisfying the incompatible setting condition are extracted and, in accordance with the processing choice associated with the incompatible setting condition, either the processing of the selection prohibited state or the processing of the hiding is performed. The processing of the selection prohibited state clarifies that the options of the setting items satisfying the incompatible setting condition cannot be selected and presents the incompatible setting condition in the form of a message, so that a relation between the options that constitute an incompatible setting condition is intuitively understandable and a method for resolving the incompatible setting condition can be clearly identified. Meanwhile, it may be desirable that the options satisfying the incompatible setting condition are hidden so that all options that can be selected by the user are in an enabled state. In such a case, the performance of the processing of the hiding allows only the options that can be selected by the user to be displayed.

The incompatible setting processing according to the second embodiment has been described for the print settings in the printing system. The incompatible setting processing can nonetheless be applied to setting items of any settings in which incompatible setting conditions can occur other than the print settings.

Details of the incompatible setting conditions, the processing choices, and the display character strings listed in the incompatible setting condition table 600a illustrated in FIG. 11 are illustrative only. An arrangement may, for example, be made to permit editing of the details of the incompatible setting conditions, the processing choices, and the display character strings listed in the incompatible setting condition table 600a through operations performed with the input unit 101 by the user. Alternatively, an arrangement may still be made to allow the processing choice specified in the incompatible setting condition table 600a to be switched, for example, for each user who logs in to the PC 100 or for each function, in addition to allowing the processing choice to be edited through the operation with the input unit 101. In this case, the incompatible setting processing unit 102, for example, may perform the switching of the processing choice.

The second embodiment has been described such that the processing choices specified by the incompatible setting condition table 600a are "0 (selection prohibited state)" and "1 (hidden)". This is, however, not the only possible arrangement. Alternatively, the processing choices may include others for achieving the incompatible setting processing.

The printing systems according to the first and second embodiments described above may also be applied to what is called a production printing system that includes a client PC, a digital front end (DFE) as a server dedicated to raster image processor (RIP) processing, and an engine. Specifically, in this case, the printing system according to each of the first and second embodiments is applied to the client PC and the DFE. Alternatively, the functions of the printing system according to each of the first and second embodiments may be applied in a distributed manner to the client PC and the DFE.

When at least one of the incompatible setting processing unit 102 including the extracting unit 102a and the prohibiting unit 102b, and the display control unit 103 is achieved by execution of a program, the program is embedded in advance and provided, for example, in the ROM 502. The program executed by the PC 100 according to each of the first and second embodiments above is recorded and provided in a computer-readable recording medium such as a compact disc read only memory (CD-ROM), a flexible disk (FD), a compact disc recordable (CD-R), and a digital versatile disc (DVD), as an installable or executable file. The program executed by the PC 100 according to each of the first and second embodiments above may be stored in a computer connected to a network such as the Internet and provided by being downloaded via the network. Furthermore, the program executed by the PC 100 according to each of the first and second embodiments above may be provided or distributed via a network such as the Internet. The program executed by the PC 100 according to each of the first and second embodiments above has a modular configuration including at least one of the incompatible setting processing unit 102 including the extracting unit 102a and the prohibiting unit 102b, and the display control unit 103. Each functional unit is loaded on a main storage and generated as actual hardware of the incompatible setting processing unit 102 including the extracting unit 102a and the prohibiting unit 102b, and the display control unit 103 on the main storage as a result of the CPU 501 loading the program from the ROM 502 and executing the loaded program.

According an embodiment, a message for resolving an incompatible setting condition can be appropriately displayed.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An incompatible setting processing apparatus comprising:
   a storage unit that stores therein incompatible setting condition information, the incompatible setting condition information associating incompatible setting conditions for options of a plurality of setting items with display character strings indicating the respective incompatible setting conditions;
   a display unit that displays a setting screen for setting the options of the setting items for print settings;
   an extracting unit that extracts, for each of the options of each of the setting items, a first option satisfying an incompatible setting condition on a basis of the incompatible setting condition information;
   a prohibiting unit that prohibits selection of the first option for the print settings;
   a display control unit that causes the display unit to display, in the setting screen, the first option extracted by the extracting unit in a manner that makes a state, where selection of the first option is prohibited by the prohibiting unit, recognizable; and
   an input unit that receives operating input from a user, and selects the first option for one of the setting items displayed in the setting screen;
   in response to selecting the first option for the one of the setting items in the setting screen, the display control unit acquires, from the incompatible setting condition information, a display character string associated with the incompatible setting condition corresponding to the first option for the one of the setting items, selection of which by the input unit is prohibited, and displays the display character string on the display unit to the user in the setting screen, wherein the display character string indicates a combination of the options of the setting items that cannot be simultaneously set with the first option selected in the setting screen.

2. The incompatible setting processing apparatus according to claim 1, wherein the display control unit displays the display character string in a message display portion near a cursor displayed on the display unit.

3. The incompatible setting processing apparatus according to claim 1, wherein, when the extracting unit extracts, for a specific option, a plurality of first options satisfying incompatible setting conditions, and when the input unit is used to select, in the setting screen, the specific option, selection of which by the input unit is prohibited by the prohibiting unit, the display control unit acquires, from the incompatible setting condition information, a plurality of display character strings associated with the incompatible setting conditions corresponding to the specific option and displays the display character strings on the display unit.

4. The incompatible setting processing apparatus according to claim 1, wherein the display control unit displays the display character string acquired from the incompatible setting condition information near the first option that corresponds to the display character string and selection of which by the input unit is prohibited.

5. The incompatible setting processing apparatus according to claim 1, wherein the display control unit causes the display unit to display the first option as shaded.

6. The incompatible setting processing apparatus according to claim 1, wherein
   the input unit receives an input of an option of a setting item in the setting screen,
   the extracting unit extracts a third option being an option of a setting item satisfying a incompatible setting condition with respect to a second option being the option input by the input unit, on a basis of the incompatible setting condition information, and
   when the extracting unit extracts the third option, the display control unit acquires, from the incompatible setting condition information, a display character string associated with the incompatible setting condition corresponding to the second option and displays the display character string on the display unit.

7. The incompatible setting processing apparatus according to claim 6, wherein the extracting unit, when not extracting the third option corresponding to the second option, extracts the first option satisfying an incompatible setting condition for each of the options of each of the setting items.

8. The incompatible setting processing apparatus according to claim 1, wherein
   the incompatible setting condition information associates the incompatible setting condition with processing information that determines processing performed for the first option by the prohibiting unit, and
   when the processing information indicates processing of hiding, the prohibiting unit hides the first option and, when the processing information indicates processing of a selection prohibited state, the prohibiting unit prohibits selection of the first option by the input unit.

9. The incompatible setting processing apparatus according to claim 8, wherein, when the processing information indicates processing of the hiding and when all options of a specific setting item corresponds to the first option, the prohibiting unit hides the specific setting item in the setting screen.

10. The incompatible setting processing apparatus according to claim 8, further comprising:
    a switching unit that switches the processing information of the incompatible setting condition information on a basis of the operating input received by the input unit or a user who logs in to the incompatible setting processing apparatus.

11. The incompatible setting processing apparatus according to claim 1, wherein
    the extracting unit extracts the first option for a specific option of a setting item when the setting item is changed.

12. The incompatible setting processing apparatus according to claim 1, wherein when the display unit displays the setting screen, the extracting unit extracts the first option satisfying an incompatible setting condition for each of the options of each of the setting items.

13. An incompatible setting processing method comprising:
    displaying, on a display unit, a setting screen for setting options of a plurality of setting items for print settings;
    extracting, for each of the options of each of the setting items, a first option satisfying an incompatible setting condition on a basis of incompatible setting condition information that associates incompatible setting conditions for the options of the setting items with display character strings indicating the respective incompatible setting conditions;

prohibiting selection of the first option for the print settings;

displaying, on the display unit in the setting screen, the first option in a manner that makes a state, where selection of the first option for the print settings is prohibited, recognizable;

receiving an operating input from a user, and selecting the first option for one of the setting items displayed in the setting screen in accordance with the operating input; and in response to selecting the first option for the one of the setting items in the setting screen, acquiring, from the incompatible setting condition information, a display character string associated with the incompatible setting condition corresponding to the first option for the one of the setting items, selection of which at the selecting has been prohibited and displaying the display character string on the display unit to the user in the setting screen, wherein the display character string indicates a combination of the options of the setting items that cannot be simultaneously set with the first option selected in the setting screen.

14. A computer program product comprising a non-transitory computer-readable medium containing an information processing program, the program causing a computer to function as:

an extracting unit that extracts, on a basis of incompatible setting condition information that associates incompatible setting conditions for options of a plurality of setting items for print settings with display character strings indicating the respective incompatible setting conditions, a first option satisfying an incompatible setting condition for each of the options of each of the setting items;

a prohibiting unit that, in a setting screen that is displayed by a display unit and is for setting the options of the setting items, prohibits selection of the first option for the print settings by an input unit that receives an operating input from a user and selects an option of each setting item in accordance with the operating input;

a display control unit that displays the first option on a display unit in the setting screen in a manner that makes a state, where selection of the first option for the print settings is prohibited, recognizable; and the input unit that receives the operating input, and selects the first option for one of the setting items displayed in the setting screen in accordance with the operating input;

in response to selecting the first option for the one of the setting items in the setting screen, the display control unit acquires, from the incompatible setting condition information, a display character string associated with the incompatible setting condition corresponding to the first option for the one of the setting items, selection of which by the input unit is prohibited, and displays the display character string on the display unit to the user in the setting screen, wherein the display character string indicates a combination of the options of the setting items that cannot be simultaneously set with the first option selected in the setting screen.

* * * * *